United States Patent
Pei et al.

(10) Patent No.: US 11,735,956 B2
(45) Date of Patent: Aug. 22, 2023

(54) WIRELESS CHARGING METHOD, DEVICE, AND SYSTEM SETTABLE TO OPERATE AT A LOAD-INDEPENDENT POINT

(71) Applicant: Huawei Technologies Co., Ltd., Shenzhen (CN)

(72) Inventors: Changsheng Pei, Dongguan (CN); Zhiqiang Zeng, Dongguan (CN); Yongfa Zhu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 278 days.

(21) Appl. No.: 16/879,309

(22) Filed: May 20, 2020

(65) Prior Publication Data

US 2020/0280216 A1    Sep. 3, 2020

Related U.S. Application Data

(63) Continuation of application No. PCT/CN2018/096160, filed on Jul. 18, 2018.

(30) Foreign Application Priority Data

Nov. 21, 2017  (CN) .......................... 201711178938.2

(51) Int. Cl.
| | |
|---|---|
| *H02J 50/12* | (2016.01) |
| *H02J 50/80* | (2016.01) |
| *H02J 50/90* | (2016.01) |
| *H02J 7/00* | (2006.01) |
| *H02J 50/40* | (2016.01) |

(52) U.S. Cl.
CPC ........ *H02J 50/12* (2016.02); *H02J 7/007182* (2020.01); *H02J 50/80* (2016.02); *H02J 50/90* (2016.02); *H02J 50/402* (2020.01)

(58) Field of Classification Search
CPC ....... H02J 50/12; H02J 50/80; H02J 7/007182
USPC ......................................................... 320/108
See application file for complete search history.

(56) References Cited

U.S. PATENT DOCUMENTS

| | | | |
|---|---|---|---|
| 9,948,112 B2 | 4/2018 | Hao et al. | |
| 2013/0082538 A1* | 4/2013 | Wambsganss | H02J 50/12 307/104 |
| 2014/0015331 A1 | 1/2014 | Kim et al. | |

(Continued)

FOREIGN PATENT DOCUMENTS

| | | |
|---|---|---|
| CN | 104009555 A | 8/2014 |
| CN | 104201792 A | 12/2014 |

(Continued)

*Primary Examiner* — Drew A Dunn
*Assistant Examiner* — Manuel Hernandez
(74) *Attorney, Agent, or Firm* — Conley Rose, P.C.

(57) ABSTRACT

A wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit.

20 Claims, 15 Drawing Sheets

(56) References Cited

U.S. PATENT DOCUMENTS

| | | | |
|---|---|---|---|
| 2015/0049516 A1* | 2/2015 | Yan | H02M 3/3376 |
| | | | 363/17 |
| 2015/0214747 A1* | 7/2015 | Abe | H02J 50/12 |
| | | | 307/104 |
| 2015/0364927 A1 | 12/2015 | Yu et al. | |
| 2016/0079794 A1 | 3/2016 | Cho et al. | |
| 2017/0163101 A1* | 6/2017 | Muratov | H02J 50/12 |
| 2017/0222483 A1 | 8/2017 | Feng et al. | |
| 2020/0099256 A1* | 3/2020 | Kanakasabai | H02J 50/12 |
| 2020/0290467 A1* | 9/2020 | Gao | H02J 7/02 |

FOREIGN PATENT DOCUMENTS

| | | | | |
|---|---|---|---|---|
| CN | 105515218 | A | 4/2016 | |
| CN | 105743228 | A | 7/2016 | |
| CN | 104333148 | B | 8/2016 | |
| CN | 106160264 | A | 11/2016 | |
| CN | 106208401 | A | 12/2016 | |
| CN | 106374578 | A | 2/2017 | |
| CN | 104953722 | B | 6/2017 | |
| CN | 107834710 | A | 3/2018 | |
| KR | 20170059389 | A * | 5/2017 | |
| WO | 2016073867 | A1 | 5/2016 | |
| WO | WO-2017165549 | A1 * | 9/2017 | B60L 53/12 |

\* cited by examiner

WIRELESS CHARGING METHOD, DEVICE, AND SYSTEM SETTABLE TO OPERATE AT A LOAD-INDEPENDENT POINT

CROSS-REFERENCE TO RELATED APPLICATIONS

This application is a continuation of International Patent Application No. PCT/CN2018/096160, filed on Jul. 18, 2018, which claims priority to Chinese Patent Application No. 201711178938.2, filed on Nov. 21, 2017, both of which are hereby incorporated by reference in their entireties.

TECHNICAL FIELD

Embodiments of the present disclosure relate to the field of electronic technologies, and in particular, to a wireless charging method, a device, and a wireless charging system.

BACKGROUND

Recent years have witnessed wider application of a wireless charging technology to electronic products. Compared with a conventional contact-type electrical energy transfer technology, a wireless electrical energy transfer technology is safer and more convenient because there is no cable connection between a power source and a load. There are mainly the following several manners of implementing wireless electrical energy transfer electromagnetic radiation, electromagnetic induction, electromagnetic resonance, and electric field coupling. Based on considerations of efficiency and safety, currently, wireless electrical energy transfer mostly uses electromagnetic induction and electromagnetic resonance for wireless charging.

Both electromagnetic induction and electromagnetic resonance wireless charging systems perform electrical energy transfer using electromagnetic induction between a coil in a transmitter and a coil in a receiver. During wireless charging, an oscillation circuit of the transmitter converts electrical energy into a high-frequency alternating current (AC) and supplies the high-frequency AC to a primary coil, the primary coil couples the electrical energy to a secondary coil of the receiver in proximity using a magnetic field that is generated from the high-frequency current, and the secondary coil receives the electrical energy, converts the electrical energy into a direct current (DC) using a converter circuit, and supplies the DC to a load for use.

However, during actual application, if there is a relatively large deviation between positions of a receiver (for example, a mobile phone) and a transmitter (for example, a wireless charging pad) during charging, efficiency in coupling between the primary coil and the secondary coil is reduced, and therefore charging efficiency of the receiver is reduced. In addition, due to a reduction in the coupling efficiency, the transmitter generates a stronger high-frequency current to generate a stronger magnetic field, and the stronger magnetic field and the low charging efficiency cause severe heating of the transmitter and the receiver.

SUMMARY

Embodiments of the present disclosure provide a wireless charging method, a device, and a wireless charging system in order to improve charging efficiency of a receiver.

According to a first aspect, an embodiment of this application provides a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit, and a self-inductance applied when the transmitter coil transfers the power to the receiver is $L_p$, and a capacitance of the first series matching capacitor is $C_p$, and a self-inductance applied when the receiver coil receives the power transferred by the first oscillation circuit is $L_s$, and a capacitance of the second series matching capacitor is $C_s$, where $$\frac{L_p * C_p}{L_s * C_s} = k,$$

and k is a positive number that meets 0.8≤k≤1.2. Circuit parameters in the transmitter and the receiver meet $$\frac{L_p * C_p}{L_s * C_s} = k.$$

The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, when a voltage gain between an output voltage of the receiver and an input voltage of the transmitter is a first voltage gain, the wireless charging system operates at a load-independent point, the load-independent point includes a first operating frequency and the first voltage gain, at the first operating frequency, the first voltage gain is independent of an output load of the receiver, and the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, k is 1, and X is $\sqrt{C_p/C_s}$, or $\sqrt{L_s/L_p}$. When k=1, $L_p*C_p$, $C_p-L_s*C_s=0$. In this case, a voltage gain is regulated to $\sqrt{C_p/C_s}$ or $\sqrt{L_s/L_p}$, and the wireless charging system operates at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, the transmitter further includes a first voltage regulation module, where the first voltage regulation module is connected to the first oscillation circuit in parallel, and the first voltage regulation module is configured to set the voltage gain between the output voltage of the receiver and the input voltage of the transmitter to the first voltage gain by regulating the input voltage of the transmitter.

In one embodiment, the receiver further includes a second voltage regulation module, where the second voltage regulation module is connected to the second oscillation circuit in parallel, and the second voltage regulation module is configured to set the voltage gain between the output voltage of the receiver and the input voltage of the transmitter to the first voltage gain by regulating the output voltage of the receiver.

According to a second aspect, an embodiment of this application provides a transmitter, where the transmitter includes a transmitter coil and a first series matching capacitor, and the transmitter coil is connected to the first series matching capacitor in series to form a first oscillation circuit, the first oscillation circuit is configured to transfer power to a receiver, and a self-inductance applied when the transmitter coil transfers the power to the receiver is $L_p$, and a capacitance of the first series matching capacitor is $C_p$, where $L_p*C_p=k*L_s*C_s$, $L_s$ is a self-inductance applied when a receiver coil in the receiver receives the power transferred by the first oscillation circuit, $C_s$ is a capacitance of a second series matching capacitor in the receiver, and k is a positive number that meets 0.8≤k≤1.2, the receiver coil is connected to the second series matching capacitor in series to form a second oscillation circuit, and the second oscillation circuit is configured to receive the power transferred by the first oscillation circuit. Circuit parameters in the transmitter meet $L_p*C_p=k*L_s*C_s$. A wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, when a voltage gain between an output voltage of the receiver and an input voltage of the transmitter is a first voltage gain, the wireless charging system operates at a load-independent point, the wireless charging system includes the transmitter and the receiver, the load-independent point includes a first operating frequency and the first voltage gain, at the first operating frequency, the first voltage gain is independent of an output load of the receiver, and the first voltage gain is X, and X is a positive number that meets $0.8*\sqrt{C_p/C_s} \leq X \leq 1.2*\sqrt{C_p/C_s}$, or X is a positive number that meets $0.8*\sqrt{L_s/L_p} \leq X \leq 1.2*\sqrt{L_s/L_p}$. Regardless of a value of a coupling factor, a voltage gain at the load-independent point is invariably $\sqrt{C_p/C_s}$, and the voltage gain is set to be within a range of $0.8*\sqrt{L_s/L_p} \leq X \leq 1.2*\sqrt{L_s/L_p}$ or within a range of $0.8*\sqrt{C_p/C_s} \leq X \leq 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, k is 1, and X is $\sqrt{C_p/C_s}$ or $\sqrt{L_s/L_p}$. When k=1, $L_p*C_p-L_s*C_s=0$. In this case, a voltage gain is regulated to $\sqrt{C_p/C_s}$ or $\sqrt{L_s/L_p}$, and the wireless charging system operates at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, the transmitter further includes a voltage regulation module, where the voltage regulation module is connected to the first oscillation circuit in parallel, and the voltage regulation module is configured to set the voltage gain between the output voltage of the receiver and the input voltage of the transmitter to the first voltage gain by regulating the input voltage of the transmitter.

According to a third aspect, an embodiment of this application provides a receiver, where the receiver includes a receiver coil and a second series matching capacitor, the receiver coil is connected to the second series matching capacitor in series to form a second oscillation circuit, and the second oscillation circuit is configured to receive power transferred by a transmitter, and a self-inductance applied when the receiver coil receives the power transferred by the transmitter is $L_s$, and a capacitance of the second series matching capacitor is $C_s$, where $$L_s * C_s = \frac{L_p * C_p}{k},$$

$L_p$ is a self-inductance applied when a transmitter coil in the transmitter transfers the power to the receiver, $C_p$ is a capacitance of a first series matching capacitor in the transmitter, and k is a positive number that meets 0.8≤k≤1.2, the transmitter coil is connected to the first series matching capacitor in series to form a first oscillation circuit, and the first oscillation circuit is configured to transfer the power to the second oscillation circuit. Circuit parameters in the receiver meet $$L_s * C_s = \frac{L_p * C_p}{k}.$$

A wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, when a voltage gain between an output voltage of the receiver and an input voltage of the transmitter is a first voltage gain, the wireless charging system operates at a load-independent point, the wireless charging system includes the transmitter and the receiver, the load-independent point includes a first operating frequency and the first voltage gain, at the first operating frequency, the first voltage gain is independent of an output load of the receiver, and the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, k is 1, and X is or $\sqrt{C_p/C_s}$ or $\sqrt{L_s/L_p}$. When k=1, $L_p*C_p-L_s*C_s=0$. In this case, a voltage gain is regulated to $\sqrt{C_p/C_s}$ or $\sqrt{L_s/L_p}$, and the wireless charging system operates at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, the receiver further includes a voltage regulation module, where the voltage regulation module is connected to the second oscillation circuit in parallel, and the voltage regulation module is configured to set the voltage gain between the output voltage of the receiver and the input voltage of the transmitter to the first voltage gain by regulating the output voltage of the receiver.

According to a fourth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit, and a self-inductance applied when the transmitter coil transfers the power to the receiver is $L_p$, and a capacitance of the first series matching capacitor is $C_p$, a self-inductance applied when the receiver coil receives the power transferred by the first oscillation circuit is $L_s$, and a capacitance of the second series matching capacitor is $C_s$, where $$\frac{L_p * C_p}{L_s * C_s} = k,$$

and k is a positive number that meets 0.8≤k≤1.2, and the method includes setting, by the transmitter, a voltage gain between an output voltage of the receiver and an input voltage of the transmitter to a first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when the voltage gain between the output voltage of the receiver and the input voltage of the transmitter is the first voltage gain, the wireless charging system operates at a load-independent point, the load-independent point includes a first operating frequency and the first voltage gain, and at the first operating frequency, the first voltage gain is independent of an output load of the receiver, and transferring, by the transmitter, power to the receiver at the first voltage gain. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, k is 1, and X is $\sqrt{C_p/C_s}$ or $\sqrt{L_s/L_p}$. When k=1, $L_p*C_p-L_s*C_s=0$. In this case, a voltage gain is regulated to $\sqrt{C_p/C_s}$ or $\sqrt{L_s/L_p}$, and the wireless charging system operates at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, the setting, by the transmitter, a voltage gain between an output voltage of the receiver and an input voltage of the transmitter to a first voltage gain includes receiving, by the transmitter, information sent by the receiver and indicating a first output voltage, where the first output voltage is an expected output voltage of the receiver, and setting, by the transmitter, the input voltage of the transmitter to a first input voltage based on the first output voltage and the first voltage gain.

In one embodiment, before the setting, by the transmitter, a voltage gain between an output voltage of the receiver and an input voltage of the transmitter to a first voltage gain, the method further includes receiving, by the transmitter, information sent by the receiver and indicating $C_s$ and/or information sent by the receiver and indicating $L_s$, where $C_s$ and $L_s$ are used by the transmitter to determine the first voltage gain, and/or receiving, by the transmitter, information sent by the receiver and indicating the first voltage gain.

According to a fifth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit, and a self-inductance applied when the transmitter coil transfers the power to the receiver is $L_p$, and a capacitance of the first series matching capacitor is $C_p$, a self-inductance applied when the receiver coil receives the power transferred by the first oscillation circuit is $L_s$, and a capacitance of the second series matching capacitor is $C_s$, where $$\frac{L_p * C_p}{L_s * C_s} = k,$$

and k is a positive number that meets 0.8≤k≤1.2, and the method includes sending, by the receiver to the transmitter, information that indicates a first output voltage, where the first output voltage is an expected output voltage of the receiver, and the first output voltage is used by the transmitter to set an input voltage of the transmitter to a first input voltage based on the first output voltage and a first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when a voltage gain between an output voltage of the receiver and the input voltage of the transmitter is the first voltage gain, the wireless charging system operates at a load-independent point, the load-independent point includes a first operating frequency and the first voltage gain, and at the first operating frequency, the first voltage gain is independent of an output load of the receiver, and receiving, by the receiver, the power transferred by the transmitter at the first voltage gain. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

According to a sixth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit, and a self-inductance applied when the transmitter coil transfers the power to the receiver is $L_p$, and a capacitance of the first series matching capacitor is $C_p$, a self-inductance applied when the receiver coil receives the power transferred by the first oscillation circuit is $L_s$, and a capacitance of the second series matching capacitor is $C_s$, where $$\frac{L_p * C_p}{L_s * C_s} = k,$$

and k is a positive number that meets 0.8≤k≤1.2, and the method includes setting, by the receiver, a voltage gain between an output voltage of the receiver and an input voltage of the transmitter to a first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when the voltage gain between the output voltage of the receiver and the input voltage of the transmitter is the first voltage gain, the wireless charging system operates at a load-independent point, the load-independent point includes a first operating frequency and the first voltage gain, and at the first operating frequency, the first voltage gain is independent of an output load of the receiver, and receiving, by the receiver, the power transferred by the transmitter at the first voltage gain. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, k is 1, and X is $\sqrt{C_p/C_s}$ or $\sqrt{L_s/L_p}$. When k=1, $L_p*C_p-L_s*C_s=0$. In this case, a voltage gain is regulated to $\sqrt{C_p/C_s}$ or $\sqrt{L_s/L_p}$, and the wireless charging system operates at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

In one embodiment, the setting, by the receiver, a voltage gain between an output voltage of the receiver and an input voltage of the transmitter to a first voltage gain includes receiving, by the receiver, information sent by the transmitter and indicating a first input voltage, where the first input voltage is the input voltage of the transmitter, and setting, by the receiver, the output voltage of the receiver to a first output voltage based on the first input voltage and the first voltage gain.

In one embodiment, before the setting, by the receiver, a voltage gain between an output voltage of the receiver and an input voltage of the transmitter to a first voltage gain, the method further includes receiving, by the receiver, information sent by the transmitter and indicating $C_p$ and/or information sent by the transmitter and indicating $L_p$, where $C_p$ and $L_p$ are used by the receiver to determine the first voltage gain, and/or receiving, by the receiver, information sent by the transmitter and indicating the first voltage gain.

According to a seventh aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, and the receiver includes a receiver coil and a second series matching capacitor, the receiver coil is connected to the second series matching capacitor in series to form a second oscillation circuit, and the second oscillation circuit is configured to receive the power transferred by the first oscillation circuit, and a self-inductance applied when the transmitter coil transfers the power to the receiver is $L_p$, and a capacitance of the first series matching capacitor is $C_p$, a self-inductance applied when the receiver coil receives the power transferred by the first oscillation circuit is $L_s$, and a capacitance of the second series matching capacitor is $C_s$, where $$\frac{L_p * C_p}{L_s * C_s} = k,$$

and k is a positive number that meets 0.8≤k≤1.2, and the method includes sending, by the transmitter to the receiver, information that indicates a first input voltage, where the first input voltage is an input voltage of the transmitter, and the first input voltage is used by the receiver to set an output voltage of the receiver to a first output voltage based on the first input voltage and a first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when a voltage gain between the output voltage of the receiver and the input voltage of the transmitter is the first voltage gain, the wireless charging system operates at a load-independent point, the load-independent point includes a first operating frequency and the first voltage gain, and at the first operating frequency, the first voltage gain is independent of an output load of the receiver, and transferring, by the transmitter, the power to the receiver at the first voltage gain. Regardless of a value of a coupling factor, a voltage gain at the load-independent point is invariably $\sqrt{C_p/C_s}$, and the voltage gain is set to be within a range of $0.8*\sqrt{L_s/L_p} \le X \le 1.2*\sqrt{L_s/L_p}$ or within a range of $0.8*\sqrt{C_p/C_s} \le X \le 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

According to an eighth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, the receiver includes a receiver coil and a second series matching capacitor, the receiver coil is connected to the second series matching capacitor in series to form a second oscillation circuit, and the second oscillation circuit is configured to receive the power transferred by the first oscillation circuit, and the method includes finding, by the transmitter from a first mapping table, a first load-independent point corresponding to a first coupling degree, or receiving, by the transmitter, information sent by the receiver and indicating a first load-independent point, where the first load-independent point is a first load-independent point corresponding to a first coupling degree and found by the receiver from a first mapping table, where the first load-independent point includes a first voltage gain, and the first coupling degree is a degree of coupling between the coil in the transmitter and the coil in the receiver, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, setting, by the transmitter, a voltage gain between an output voltage of the receiver and an input voltage of the transmitter to the first voltage gain, and transferring, by the transmitter, the power to the receiver at the first voltage gain.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

In one embodiment, the setting, by the transmitter, a voltage gain between an output voltage of the receiver and an input voltage of the transmitter to the first voltage gain includes receiving, by the transmitter, information sent by the receiver and indicating a first output voltage, where the first output voltage is an expected output voltage of the receiver, and setting, by the transmitter, the input voltage of the transmitter to a first input voltage based on the first output voltage and the first voltage gain.

In one embodiment, before the setting, by the transmitter, a voltage gain between an output voltage of the receiver and an input voltage of the transmitter to the first voltage gain, the method further includes receiving, by the transmitter, information sent by the receiver and indicating $C_s$ and/or information sent by the receiver and indicating $L_s$, where $C_s$ and $L_s$ are used by the transmitter to determine the first voltage gain, and/or receiving, by the transmitter, information sent by the receiver and indicating the first voltage gain.

According to a ninth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, the receiver includes a receiver coil and a second series matching capacitor, the receiver coil is connected to the second series matching capacitor in series to form a second oscillation circuit, and the second oscillation circuit is configured to receive the power transferred by the first oscillation circuit, and the method includes sending, by the receiver to the transmitter, information that indicates a first output voltage, where the first output voltage is an expected output voltage of the receiver, and the first output voltage is used by the transmitter to set an input voltage of the transmitter to a first input voltage based on the first output voltage and a first voltage gain, where the first voltage gain is included in a first load-independent point corresponding to a first coupling degree and found by the transmitter from a first mapping table, or the first voltage gain is included in a first load-independent point corresponding to a first coupling degree and found by the receiver from a first mapping table, and the first load-independent point is added to information indicating the first load-independent point, and then sent by the receiver to the transmitter, where the first coupling degree is a degree of coupling between the transmitter coil in the transmitter and the receiver coil in the receiver, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, and receiving, by the receiver, the power transferred by the transmitter at the first voltage gain.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

According to a tenth aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, the receiver includes a receiver coil and a second series matching capacitor, the receiver coil is connected to the second series matching capacitor in series to form a second oscillation circuit, and the second oscillation circuit is configured to receive the power transferred by the first oscillation circuit, and the method includes finding, by the receiver from a first mapping table, a first load-independent point corresponding to a first coupling degree, or receiving, by the receiver, information sent by the transmitter and indicating a first load-independent point, where the first load-independent point is a first load-independent point corresponding to a first coupling degree and found by the transmitter from a first mapping table, where the first load-independent point includes a first voltage gain, and the first coupling degree is a degree of coupling between the transmitter coil in the transmitter and the receiver coil in the receiver, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, setting, by the receiver, a voltage gain between an output voltage of the receiver and an input voltage of the transmitter to the first voltage gain, and receiving, by the receiver, the power transferred by the transmitter at the first voltage gain.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

In one embodiment, the setting, by the receiver, a voltage gain between an output voltage of the receiver and an input voltage of the transmitter to the first voltage gain includes receiving, by the receiver, information sent by the transmitter and indicating a first input voltage, where the first input voltage is the input voltage of the transmitter, and setting, by the receiver, the output voltage of the receiver to a first output voltage based on the first input voltage and the first voltage gain.

In one embodiment, before the setting, by the receiver, a voltage gain between an output voltage of the receiver and an input voltage of the transmitter to the first voltage gain, the method further includes receiving, by the receiver, information sent by the transmitter and indicating $C_p$ and/or information sent by the transmitter and indicating $L_p$, where $C_p$ and $L_p$ are used by the receiver to determine the first voltage gain, and/or receiving, by the receiver, information sent by the transmitter and indicating the first voltage gain.

According to an eleventh aspect, an embodiment of this application provides a charging method based on a wireless charging system, where the wireless charging system includes a transmitter and a receiver, the transmitter includes a transmitter coil and a first series matching capacitor, the transmitter coil is connected to the first series matching capacitor in series to form a first oscillation circuit, and the first oscillation circuit is configured to transfer power to the receiver, the receiver includes a receiver coil and a second series matching capacitor, the receiver coil is connected to the second series matching capacitor in series to form a second oscillation circuit, and the second oscillation circuit is configured to receive the power transferred by the first oscillation circuit, and the method includes sending, by the transmitter to the receiver, information that indicates a first input voltage, where the first input voltage is an input voltage of the transmitter, the first input voltage is used by the receiver to set an output voltage of the receiver to a first output voltage based on the first input voltage and a first voltage gain, the first voltage gain is included in a first load-independent point corresponding to a first coupling degree and found by the transmitter from a first mapping table, or the first voltage gain is included in a first load-independent point corresponding to a first coupling degree and found by the receiver from a first mapping table, and the first load-independent point is added to information indicating the first load-independent point, and then sent by the receiver to the transmitter, where the first coupling degree is a degree of coupling between the transmitter coil in the transmitter and the receiver coil in the receiver, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, and transferring, by the transmitter, the power to the receiver at the first voltage gain.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

According to a twelfth aspect, an embodiment of this application provides a transmitter, where the transmitter includes a module or a unit configured to perform the wireless charging method provided in the fourth aspect or any possible implementation of the fourth aspect.

According to a thirteenth aspect, an embodiment of this application provides a receiver, where the receiver includes a module or a unit configured to perform the wireless charging method provided in the fifth aspect.

According to a fourteenth aspect, an embodiment of this application provides a receiver, where the receiver includes a module or a unit configured to perform the wireless charging method provided in the sixth aspect or any possible implementation of the sixth aspect.

According to a fifteenth aspect, an embodiment of this application provides a transmitter, where the transmitter includes a module or a unit configured to perform the wireless charging method provided in the seventh aspect.

According to a sixteenth aspect, an embodiment of this application provides a transmitter, where the transmitter includes a module or a unit configured to perform the wireless charging method provided in the eighth aspect or any possible implementation of the eighth aspect.

According to a seventeenth aspect, an embodiment of this application provides a receiver, where the receiver includes a module or a unit configured to perform the wireless charging method provided in the ninth aspect or any possible implementation of the ninth aspect.

According to an eighteenth aspect, an embodiment of this application provides a receiver, where the receiver includes a module or a unit configured to perform the wireless charging method provided in the tenth aspect or any possible implementation of the tenth aspect.

According to a nineteenth aspect, an embodiment of this application provides a transmitter, where the transmitter includes a module or a unit configured to perform the wireless charging method provided in the eleventh aspect or any possible implementation of the eleventh aspect.

According to a twentieth aspect, an embodiment of this application provides a transmitter, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the fourth aspect or any possible implementation of the fourth aspect.

According to a twenty-first aspect, an embodiment of this application provides a receiver, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the fifth aspect or any possible implementation of the fifth aspect.

According to a twenty-second aspect, an embodiment of this application provides a receiver, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the sixth aspect or any possible implementation of the sixth aspect.

According to a twenty-third aspect, an embodiment of this application provides a transmitter, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the seventh aspect or any possible implementation of the seventh aspect.

According to a twenty-fourth aspect, an embodiment of this application provides a transmitter, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the eighth aspect or any possible implementation of the eighth aspect.

According to a twenty-fifth aspect, an embodiment of this application provides a receiver, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the ninth aspect or any possible implementation of the ninth aspect.

According to a twenty-sixth aspect, an embodiment of this application provides a receiver, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the tenth aspect or any possible implementation of the tenth aspect.

According to a twenty-seventh aspect, an embodiment of this application provides a transmitter, including a processor, a memory, a transceiver, and a bus, where the processor, the transceiver, and the memory communicate with each other using the bus, the transceiver is configured to receive and send data, the memory is configured to store an instruction, and the processor is configured to invoke the instruction in the memory, to perform the wireless charging method provided in the eleventh aspect or any possible implementation of the eleventh aspect.

According to a twenty-eighth aspect, an embodiment of this application provides a computer readable storage medium, where the storage medium includes an instruction, and when the instruction is run on a transmitter, the transmitter performs the wireless charging method provided in the fourth aspect or any possible implementation of the fourth aspect.

According to a twenty-ninth aspect, an embodiment of this application provides a computer readable storage medium, where the storage medium includes an instruction, and when the instruction is run on a receiver, the receiver performs the wireless charging method provided in the fifth aspect or any possible implementation of the fifth aspect.

According to a thirtieth aspect, an embodiment of this application provides a computer readable storage medium, where the storage medium includes an instruction, and when the instruction is run on a receiver, the receiver performs the wireless charging method provided in the sixth aspect or any possible implementation of the sixth aspect.

According to a thirty-first aspect, an embodiment of this application provides a computer readable storage medium, where the storage medium includes an instruction, and when the instruction is run on a transmitter, the transmitter performs the wireless charging method provided in the seventh aspect or any possible implementation of the seventh aspect.

According to a thirty-second aspect, an embodiment of this application provides a computer readable storage medium, where the storage medium includes an instruction, and when the instruction is run on a transmitter, the transmitter performs the wireless charging method provided in the eighth aspect or any possible implementation of the eighth aspect.

According to a thirty-third aspect, an embodiment of this application provides a computer readable storage medium, where the storage medium includes an instruction, and when the instruction is run on a receiver, the receiver performs the wireless charging method provided in the ninth aspect or any possible implementation of the ninth aspect.

According to a thirty-fourth aspect, an embodiment of this application provides a computer readable storage medium, where the storage medium includes an instruction, and when the instruction is run on a receiver, the receiver performs the wireless charging method provided in the tenth aspect or any possible implementation of the tenth aspect.

According to a thirty-fifth aspect, an embodiment of this application provides a computer readable storage medium, where the storage medium includes an instruction, and when the instruction is run on a transmitter, the transmitter performs the wireless charging method provided in the eleventh aspect or any possible implementation of the eleventh aspect.

According to a thirty-sixth aspect, an embodiment of this application provides a computer program, where the computer program includes an instruction, and when the instruction is run on a transmitter, the transmitter performs the wireless charging method provided in the fourth aspect or any possible implementation of the fourth aspect.

According to a thirty-seventh aspect, an embodiment of this application provides a computer program, where the computer program includes an instruction, and when the instruction is run on a receiver, the receiver performs the wireless charging method provided in the fifth aspect.

According to a thirty-eighth aspect, an embodiment of this application provides a computer program, where the computer program includes an instruction, and when the instruction is run on a receiver, the receiver performs the wireless charging method provided in the sixth aspect or any possible implementation of the sixth aspect.

According to a thirty-ninth aspect, an embodiment of this application provides a computer program, where the computer program includes an instruction, and when the instruction is run on a transmitter, the transmitter performs the wireless charging method provided in the seventh aspect or any possible implementation of the seventh aspect.

According to a fortieth aspect, an embodiment of this application provides a computer program, where the computer program includes an instruction, and when the instruction is run on a transmitter, the transmitter performs the wireless charging method provided in the eighth aspect or any possible implementation of the eighth aspect.

According to a forty-first aspect, an embodiment of this application provides a computer program, where the computer program includes an instruction, and when the instruction is run on a receiver, the receiver performs the wireless charging method provided in the ninth aspect.

According to a forty-second aspect, an embodiment of this application provides a computer program, where the computer program includes an instruction, and when the instruction is run on a receiver, the receiver performs the wireless charging method provided in the tenth aspect or any possible implementation of the tenth aspect.

According to a forty-third aspect, an embodiment of this application provides a computer program, where the computer program includes an instruction, and when the instruction is run on a transmitter, the transmitter performs the wireless charging method provided in the eleventh aspect or any possible implementation of the eleventh aspect.

According to a forty-fourth aspect, an embodiment of this application provides a chip product of a transmitter, to perform the method in the fourth aspect or any possible implementation of the fourth aspect.

According to a forty-fifth aspect, an embodiment of this application provides a chip product of a receiver, to perform the method in the fifth aspect or any possible implementation of the fifth aspect.

According to a forty-sixth aspect, an embodiment of this application provides a chip product of a receiver, to perform the method in the sixth aspect or any possible implementation of the sixth aspect.

According to a forty-seventh aspect, an embodiment of this application provides a chip product of a transmitter, to perform the method in the seventh aspect or any possible implementation of the seventh aspect.

According to a forty-eighth aspect, an embodiment of this application provides a chip product of a transmitter, to perform the method in the eighth aspect or any possible implementation of the eighth aspect.

According to a forty-ninth aspect, an embodiment of this application provides a chip product of a receiver, to perform the method in the ninth aspect or any possible implementation of the ninth aspect.

According to a fiftieth aspect, an embodiment of this application provides a chip product of a receiver, to perform the method in the tenth aspect or any possible implementation of the tenth aspect.

According to a fifty-first aspect, an embodiment of this application provides a chip product of a transmitter, to perform the method in the eleventh aspect or any possible implementation of the eleventh aspect.

In the embodiments of this application, the wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module in the receiver can be reduced, and charging efficiency of the receiver can be improved.

BRIEF DESCRIPTION OF DRAWINGS

To describe the technical solutions in the embodiments of the present disclosure or in the background more clearly, the following describes the accompanying drawings required in the embodiments of the present disclosure or in the background.

DESCRIPTION OF EMBODIMENTS

The following describes the embodiments of the present disclosure with reference to the accompanying drawings in the embodiments of the present disclosure. Terms used in the embodiments of this application are only used to explain specific embodiments of this application, and are not intended to limit this application.

Embodiments of this application disclose a wireless charging method and a device in order to improve charging efficiency of a receiver. Detailed descriptions are separately provided below.

Figure 1:
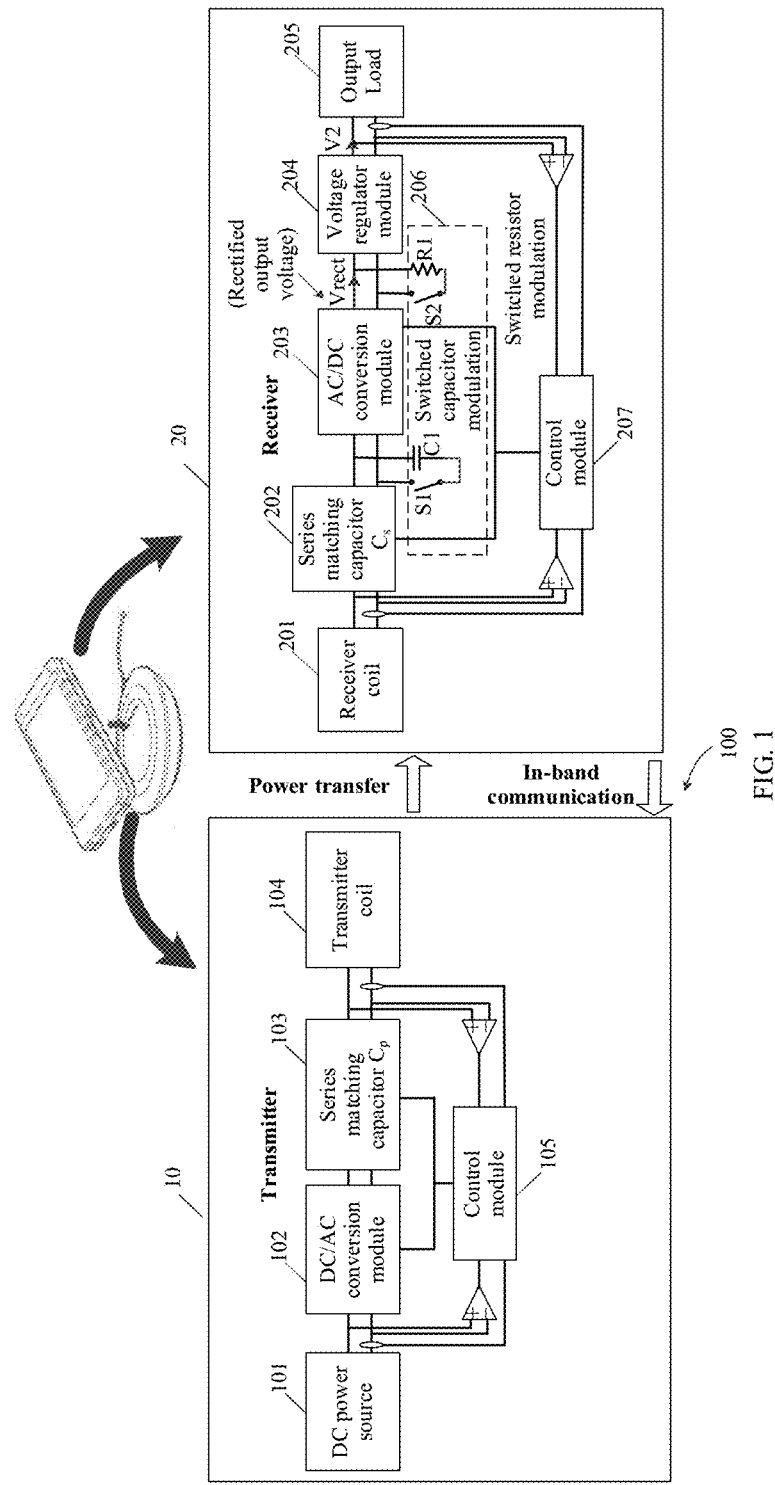
FIG. 1 is a schematic architectural diagram of a wireless charging system to which an embodiment of this application relates.

FIG. 1 is a schematic architectural diagram of a wireless charging system to which an embodiment of this application relates. As shown in FIG. 1, the wireless charging system 100 includes a transmitter 10 and a receiver 20. The transmitter 10 can transfer power to the receiver 20, to wirelessly charge the receiver 20.

The receiver 20 may be mobile user equipment (UE), an access terminal, a subscriber unit, a subscriber station, a mobile station, a remote station, a remote terminal, a user terminal, or a user agent. The access terminal may be a cellular phone, a handheld device having a wireless communication function, a computing device or an in-vehicle device, a wearable device, a terminal in a fifth generation (5G) system or a terminal in a future evolved public land mobile network (PLMN), or the like. Specifically, the receiver 20 may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Alternatively, the receiver 20 may be a wireless charging electric vehicle or white goods, for example, a no-tail television, a wireless charging soymilk maker, a wireless charging vacuum cleaning robot, or a multi-rotor drone.

A manner of data communication between the transmitter 10 and the receiver 20 may be wireless communication, and may be specifically in-band communication, BLUETOOTH communication, ZIGBEE communication, WI-FI communication, or the like.

The transmitter 10 may include a DC power source 101, a DC/AC conversion module 102, a series matching capacitor (whose capacitance is $C_p$) 103, a transmitter coil 104, and a control module 105. The receiver 20 may include a receiver coil 201, a series matching capacitor (whose capacitance is $C_s$) 202, an AC/DC conversion module 203, a voltage regulator module 204, a output load 205, a modulation module 206, and a control module 207.

Specifically, as shown in FIG. 1, the DC power source 101 is configured to supply charging power. The DC/AC conversion module 102 is connected to the DC power source 101, and is configured to receive a DC that is output by the DC power source 101, convert the received DC into an AC, and output the AC. The series matching capacitor (whose capacitance is $C_p$) 103 and the transmitter coil 104 are connected to form an oscillation circuit. The oscillation circuit is connected to the DC/AC conversion module 102, and is configured to receive the AC that is output by the DC/AC conversion module 102 and supply the AC to the transmitter coil 104. Power of the transmitter coil 104 is transferred to the receiver coil 201 under coupling of the transmitter coil 104 and the receiver coil 201. The control module 105 may be separately connected to the DC power source 101, the DC/AC conversion module 102, the series matching capacitor (whose capacitance is $C_p$) 103, and the transmitter coil 104, and is configured to exchange a control parameter with each module, to implement control on each module.

The DC/AC conversion module 102 may be a full-bridge inverter circuit, or may be a half-bridge inverter circuit, or may be another inverter circuit that converts a DC into an AC. This is not limited in this embodiment of this application.

As shown in FIG. 1, the receiver coil 201 is connected to the series matching capacitor (whose capacitance is $C_s$) 202, to form an oscillation circuit on a side of the receiver 20. The receiver coil 201 receives, through coil coupling, the power transferred by the transmitter coil 104, and converts the power into an AC using the oscillation circuit. The AC/DC conversion module 203 is connected to the oscillation circuit, and is configured to receive the AC that is output by the oscillation circuit, and rectify the AC to obtain an output voltage Vrect. The voltage regulator module 204 is connected to the AC/DC conversion module 203, and is configured to eliminate fluctuation in the output voltage Vrect from the AC/DC conversion module 203, to output a stable voltage V2. The output load 205 is connected to the voltage regulator module 204, and is configured to receive the supply voltage V2 that is output by the voltage regulator module 204. The modulation module 206 is configured to implement in-band communication with the transmitter 10.

Specifically, as shown in FIG. 1, the modulation module 206 may use switched capacitor modulation and/or switched resistor modulation. The receiver 20 controls connection and disconnection of a switch S1 and/or a switch S2, to allow a capacitor C1 and/or a resistor R1 to be connected to a receiver circuit or not connected to a receiver circuit such that a voltage or a current in the receiver coil 201 in the receiver 20 is changed, and a voltage or a current in the transmitter 10 is changed. The transmitter 10 collects the voltage or the current and can obtain, through analysis after demodulation processing, a communication signal modulated by the receiver 20. The control module 207 may be separately connected to the receiver coil 201, the series matching capacitor (whose capacitance is $C_s$) 202, the AC/DC conversion module 203, the voltage regulator module 204, the output load 205, and the modulation module 206, and is configured to exchange a control parameter with each module, to implement control on each module.

The AC/DC conversion module 102 may be a diode full-bridge rectifier circuit, or may be a switching transistor synchronous rectifier circuit, or may be a half-bridge rectifier circuit, or may be another rectifier circuit that converts an AC into a DC. This is not limited in this embodiment of this application.

During in-band communication, connection of the modulation capacitor C1 and connection of the modulation resistor R1 may cause fluctuation in a load in a circuit of the receiver 20. For example, if a load jump occurs in the receiver 20, an operating frequency needs to be regulated to maintain a constant output voltage of the receiver according to the Wireless Power Consortium (WPC) standard. In this process, a control parameter for regulating the operating frequency needs to be transmitted through the in-band communication. During the in-band communication, the in-band communication may affect an output load of the receiver. For example, in a capacitor modulation mode, if the AC/DC conversion module 203 is a full-wave rectifier diode bridge, connection of the modulation capacitor C1 is equivalent to a capacitance increase at two rectifier tubes of a rectifier bridge. When a polarity of a current flowing into the rectifier bridge changes, the modulation capacitor C1 may be charged or discharged, which is equivalent to a load disturbance and may affect V1.

Connection and disconnection of the modulation capacitor and/or the modulation resistor cause V1 to change at a relatively high amplitude. V2 that is output by the voltage regulator module 204 is a stable DC voltage. A part of the voltage V1 exceeding V2 is consumed by the voltage regulator module 204, and becomes power consumption of the voltage regulator module 204, increasing an electrical energy loss of the receiver 20.

When there is a deviation between positions at which the receiver 20 and the transmitter 10 are placed, the transmitter coil 104 and the receiver coil 201 do not directly face each other, and there is misalignment. A load jump may cause noticeable fluctuation in the output voltage V1. In addition, the in-band communication may cause a jump of the output voltage V1, the voltage regulator module 204 operates frequently, an electrical energy loss of the voltage regulator module 204 is increased, and charging efficiency is reduced.

Based on the schematic architectural diagram of the wireless charging system in FIG. 1, this application provides a wireless charging method such that output voltage fluctuation caused by a load jump can be reduced, and an output voltage jump caused by in-band communication can be reduced. Therefore, an electrical energy loss of a voltage regulator module can be reduced, and charging efficiency of a receiver can be improved.

A main principle of this application may include enabling a wireless charging system to operate at a load-independent point through voltage regulation and operating frequency regulation such that a voltage gain is independent of a load impedance of a receiver. Therefore, regardless of a value of an output load impedance of the receiver, both an operating frequency and a voltage gain that are used when a transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

For example, the wireless charging system operates at a load-independent point ($\varpi 0$, X0). In an embodiment, the voltage gain between the output voltage of the receiver and the input voltage of the transmitter is X0, the input voltage of the transmitter is $V_{in0}$, the output voltage of the receiver is $V_{out0}$, $V_{out0}/V_{in0}$=X0, and an operating frequency at which the transmitter transfers power to the receiver is $\varpi 0$. When the output load of the transmitter jumps, because the wireless charging system operates at the load-independent point, an output load jump does not affect the voltage gain between the output voltage of the receiver and the input voltage of the transmitter, and the voltage gain is still X0. The input voltage $V_{in0}$ of the transmitter does not change, and therefore the output voltage $V_{out0}$ of the receiver does not change. Fluctuation of a voltage that is input into the voltage regulator module fluctuates very slightly before and after the output load jump. Therefore, the electrical energy loss of the voltage regulator module is reduced, and the charging efficiency of the receiver can be improved.

To help understand the embodiments of this application, some concepts or terms related to a load-independent point in the embodiments of this application are explained.

(1) Coupling Factor and Mutual Inductance

Figure 2:
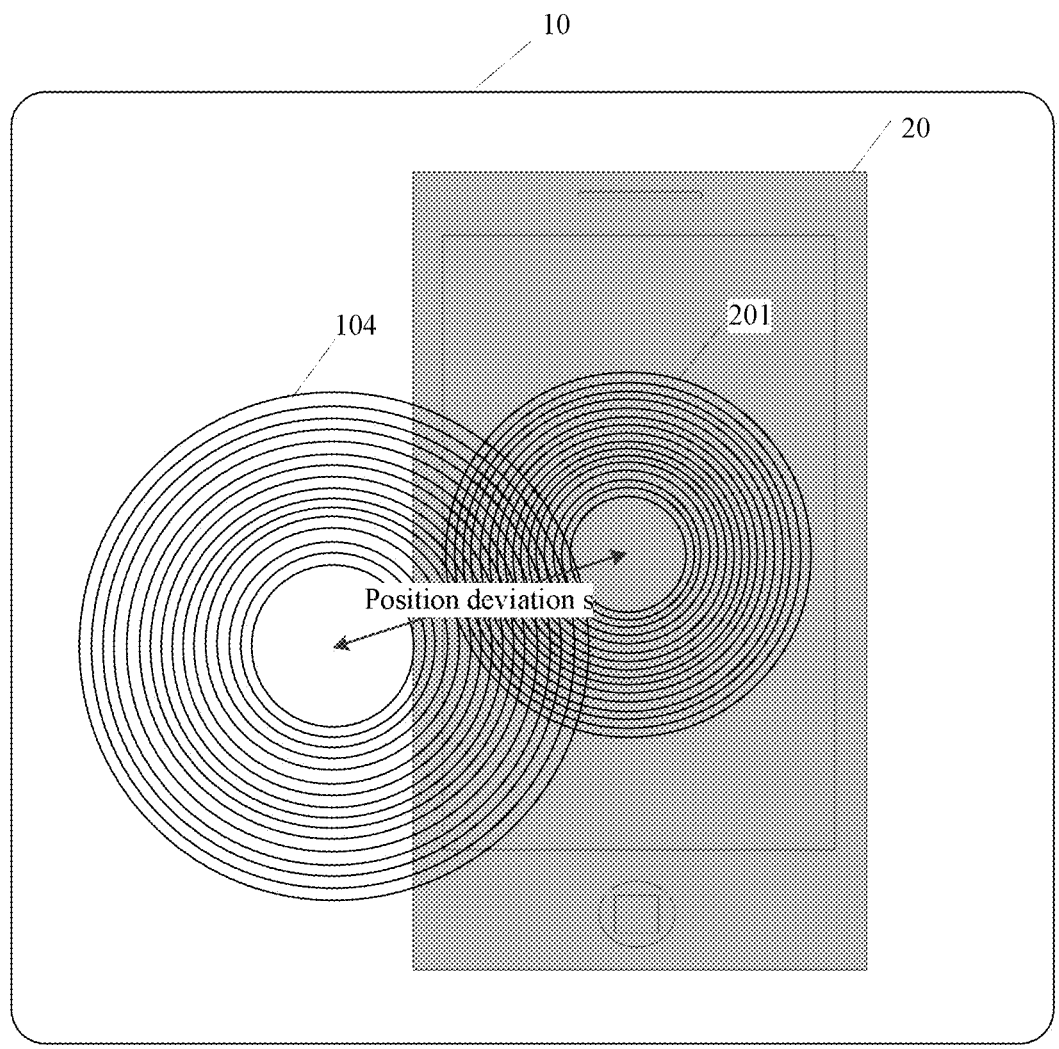
FIG. 2 is a schematic diagram of a position deviation between a transmitter and a receiver according to an embodiment of this application.

A coupling factor is used to represent closeness of coupling between the transmitter coil in the transmitter 10 and the receiver coil in the receiver 20. A higher coupling factor indicates higher efficiency at which the transmitter coil in the transmitter 10 transfers power to the receiver coil in the receiver 20. The coupling factor is related to the position deviation between the transmitter 10 and the receiver 20. A larger position deviation between the transmitter 10 and the receiver 20 indicates lower closeness of the coupling between the transmitter coil in the transmitter 10 and the receiver coil in the receiver 20 and a smaller coupling factor. Therefore, during wireless charging, a smaller position deviation between the transmitter 10 and the receiver 20 leads to higher charging efficiency of the wireless charging system. That is, a coupling factor K is determined by the position deviation between the transmitter 10 and the receiver 20. The position deviation herein is a deviation between positions of the transmitter coil in the transmitter 10 and the receiver coil in the receiver 20. For details, refer to FIG. 2. FIG. 2 is a schematic diagram of a position deviation between a transmitter and a receiver according to an embodiment of this application. As shown in FIG. 2, a position deviation s between the transmitter 10 and the receiver 20 may be understood as a deviation between positions of a center of the transmitter coil 104 in the transmitter 10 and a center of the receiver coil 201 in the receiver 20, for example, may be a horizontal distance between the center of the transmitter coil 104 in the transmitter 10 and the center of the receiver coil 201 in the receiver 20. If the transmitter 10 includes a plurality of transmitter coils, the position deviation s between the transmitter 10 and the receiver 20 may alternatively be understood as a deviation between positions of a center of a target transmitter coil in the transmitter 10 and the center of the receiver coil 201 in the receiver 20. The target transmitter coil may be one or more transmitter coils in the transmitter 10 that are closest to the receiver coil 201 in the receiver 20.

A mutual inductance is short for a coefficient of mutual induction, and may be used to represent magnitude of a phenomenon of mutual induction between the transmitter coil in the transmitter and the receiver coil in the receiver. A relationship between the coupling factor K and a mutual inductance M is $$K = \frac{M}{\sqrt{L_p * L_s}},$$

where $L_p$ and $L_s$ are respectively an equivalent inductance of the receiver and an equivalent inductance of the transmitter during power transfer. Magnitude of the mutual inductance can also reflect the position deviation between the transmitter and the receiver.

The coupling factor and the mutual inductance can both be used to indicate a degree of coupling between the transmitter coil in the transmitter 10 and the receiver coil in the receiver 20. Certainly, a newly defined parameter may also be used to indicate the degree of coupling between the transmitter coil in the transmitter 10 and the receiver coil in the receiver 20. The coupling factor K is used as an example for description in the embodiments of this application. It can be understood that in the embodiments of this application, the degree of coupling between the transmitter coil in the transmitter 10 and the receiver coil in the receiver 20 is not limited to being indicated by the coupling factor, but may be indicated by the mutual inductance or may be indicated by another newly defined parameter.

(2) Operating Frequency and Voltage Gain

An operating frequency is a frequency at which the transmitter transfers power to the receiver in the wireless charging system. Different power is transferred on a coupling coil at different operating frequencies. When the operating frequency is $$\frac{1}{2\prod \sqrt{L_p * L_p}},$$

power transferred on the coupling coil is maximum.

When output power or an output voltage of the receiver needs to be regulated, control information may be transmitted to the transmitter in a form of an error control information packet through in-band communication, the transmitter adjusts, based on the control information, an operating frequency at which the transmitter transfers power, thereby adjusting intensity of a magnetic field in the equivalent inductance $L_p$ of the transmitter to achieve expected output power or an expected output voltage of the receiver.

A voltage gain is a ratio of an output voltage of a receiver to an input voltage of a transmitter. The output voltage is a voltage value that is obtained after rectification by an AC/DC conversion module in the receiver, and the input voltage is a voltage value that is obtained after conversion by a DC/AC conversion module in the transmitter. When an operating frequency of the wireless charging system changes, a voltage gain changes accordingly.

(3) Load-Independent Point a. What is a Load-Independent Point?

The load-independent point is a point that is on a relationship curve between a voltage gain and an operating frequency and at which a change in an output load impedance of a receiver does not affect a voltage gain and an operating frequency of the wireless charging system.

Figure 3:
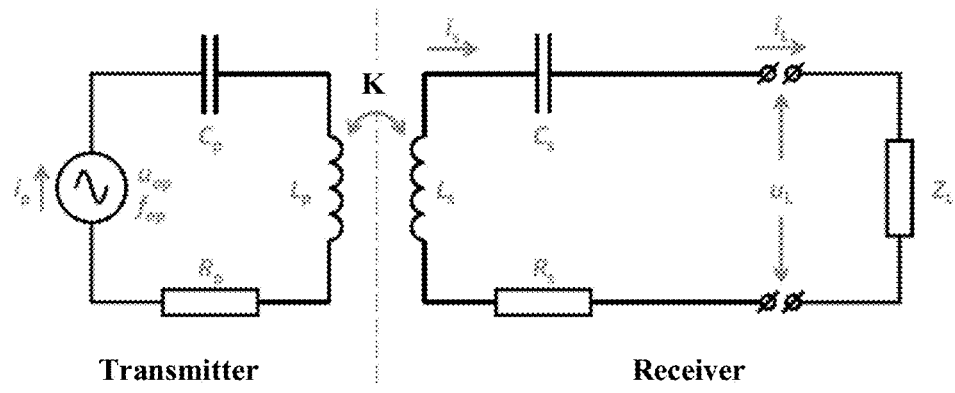
FIG. 3 shows an equivalent circuit model of a wireless charging system according to an embodiment of this application.

FIG. 3 shows an equivalent circuit model of a wireless charging system according to an embodiment of this application. As shown in FIG. 3, the wireless charging system shown in FIG. 1 may be equivalent to a magnetic coupling structure model of the wireless charging system shown in FIG. 3. An output voltage of a transmitter is $U_{op}$, an output current of the transmitter is $I_{op}$, and a frequency of the output voltage and the output current is $f_{op}$. $C_p$ is a series matching capacitance of the transmitter, $L_p$ is a self-inductance applied when a transmitter coil in the transmitter transfers power to the receiver, and $R_p$ is an input resistance of the transmitter. $C_s$ is a series matching capacitance of the receiver, $L_s$ is a self-inductance applied when a receiver coil in the receiver receives the power transferred by the transmitter, $R_s$ is a resistance of the receiver, $i_s$ is a current on the coil of the receiver, and $Z_L$ is a load impedance. $i_L$ and $u_L$ are a load current and a load voltage, respectively. K is a coupling factor between the coil of the transmitter and the coil of the receiver. A series matching capacitor (whose capacitance is $C_p$) of the transmitter and the transmitter coil form a first oscillation circuit, a series matching capacitor (whose capacitance is $C_s$) of the receiver and the receiver coil form a second oscillation circuit, and the first oscillation circuit is configured to transfer power to the second oscillation circuit. The second oscillation circuit is configured to receive the power transferred by the first oscillation circuit, and transfer the power to an AC/DC conversion module. In the embodiments of this application, the series matching capacitor of the transmitter may be referred to as a first series matching capacitor, and the series matching capacitor of the receiver may be referred to as a second series matching capacitor.

Figure 4:
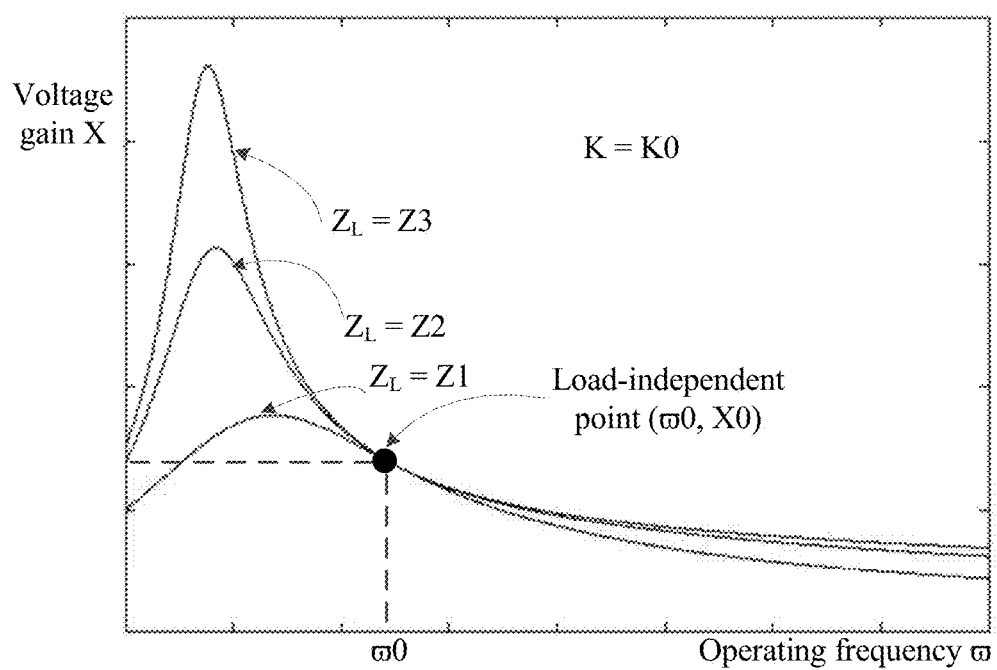
FIG. 4 is a schematic diagram of a relationship between a voltage gain and an operating frequency according to an embodiment of this application.

When the coupling factor K is fixed, a curve of a relationship between a voltage gain X and an operating frequency $\varpi$ varies with an output load impedance of the receiver. FIG. 4 is a schematic diagram of a relationship between a voltage gain and an operating frequency according to an embodiment of this application. As shown in FIG. 4, when the coupling factor K is a fixed value K0, a set of X–$\varpi$ curves corresponding to a load impedance $Z_L$ whose values are Z1, Z2, and Z3 are respectively drawn, where Z1, Z2, and Z3 are different values. The set of X–$\varpi$ curves corresponding to Z1, Z2, and Z3 intersect at a same point. At this intersection point, regardless of a value of the load impedance of the wireless charging system, an operating frequency is $\varpi$ 0, a voltage gain is X0, and ($\varpi$ 0, X0) may be referred to as a load-independent point. The load-independent point is an inherent feature of the wireless charging system. At the load-independent point, if the operating frequency of the wireless charging system is regulated to $\varpi$ 0, the voltage gain is invariably X0 regardless of a value of the output load impedance $Z_L$ of the receiver.

The following provides specific calculation of the voltage gain X0 and the operating frequency $\varpi$ 0 of the load-independent point of the wireless charging system.

Figure 5:
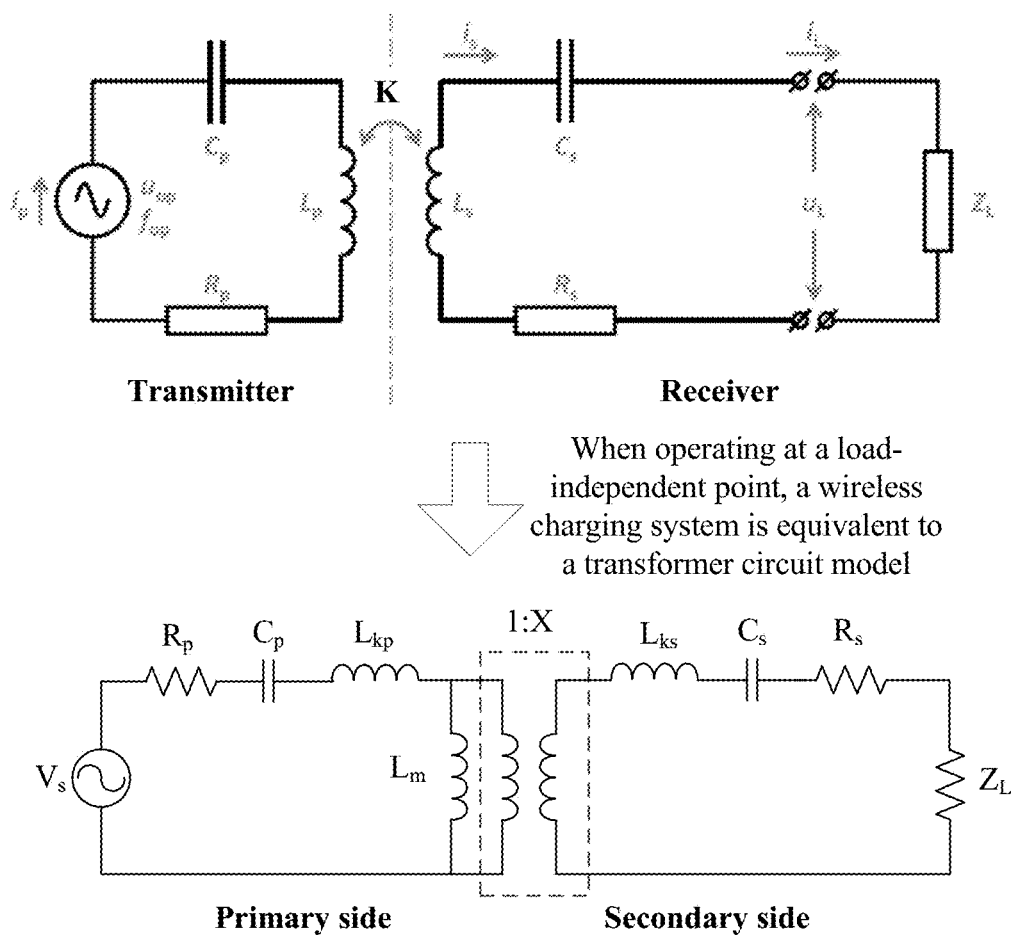
FIG. 5 shows another equivalent circuit model of a wireless charging system according to an embodiment of this application.

Because the wireless charging system has a fixed voltage gain at the load-independent point, and a transformer circuit has a constant voltage transformation ratio, if the voltage gain is analogized to the voltage transformation ratio, the wireless charging system that operates at the load-independent point can be equivalent to a transformer circuit model. FIG. 5 shows another equivalent circuit model of a wireless charging system according to an embodiment of this application.

As shown in FIG. 5, in the equivalent transformer circuit model, $L_{kp}$ is a transformer primary leakage inductance, $L_{ks}$ is a transformer secondary leakage inductance, and $L_m$ is a transformer primary excitation inductance. A transformer voltage transformation ratio may be understood as a voltage gain X, that is, Output voltage/Input voltage=X. It can be understood that the equivalent circuit model of the wireless charging system shown in FIG. 3 can be equivalent to the transformer equivalent transformer circuit model shown in FIG. 5 only when the wireless charging system operates at a load-independent point.

The following can be obtained based on the equivalent transformer circuit model $$L_{kp}=L_p-L_m \quad (1)$$

$$L_{ks}=L_s-L_m*X^2 \quad (2).$$

In the equivalent transformer circuit model, it can be learned that $C_p$ and $L_{kp}$ form series resonance, and $C_s$ and $L_{ks}$ form series resonance. A primary side and a secondary side have a same series resonance frequency $\varpi$, the series resonance frequency is an operating frequency of the wireless charging system, and the series resonance frequency $\varpi$ is calculated as follows $$\varpi = \frac{1}{\sqrt{(L_p-L_m)*C_p}} = \frac{1}{\sqrt{(L_s-L_m*X^2)*C_s}}. \quad (3)$$

The following can be obtained based on formula (3)

$$(L_p-L_m)*C_p=(L_s-L_m*X^2)*C_s \quad (4).$$

The following can be obtained by sorting out formula (4)

$$L_p*C_p-L_s*C_s=L_m*(C_p-C_s*X^2) \quad (5).$$

Usually, after the wireless charging system has been designed, $L_p$, $C_p$, $L_s$, and $C_s$ are fixed values. Therefore, assuming that $L_p*C_p-L_s*C_s$=Const (briefly referred to as Const below), a voltage transformation ratio of the equivalent transformer circuit model can be obtained, that is, the voltage gain X of the wireless charging system is $$X = \sqrt{\frac{C_p - \frac{Const}{L_m}}{C_s}}, \quad (6)$$

where $\varpi$ 0 and X0 may be expressed as formula (3) and formula (6), respectively.

It can be learned that a load-independent point is related to a coupling factor. During actual wireless charging, when positions at which the transmitter and the receiver are placed are definite, the coupling factor is a fixed value. Therefore, when relative displacement of the transmitter and the receiver is constant, the load-independent point is also definite. The relationship between the coupling factor K and the mutual inductance M is $$K = \frac{M}{\sqrt{L_p*L_s}}.$$

Therefore, a relationship between the mutual inductance M and the load-independent point is similar to that between the coupling factor and the load-independent point.

b. Two Load-Independent Points

Based on the foregoing properties of the load-independent point, a design idea of this application is described below.

Figure 6:
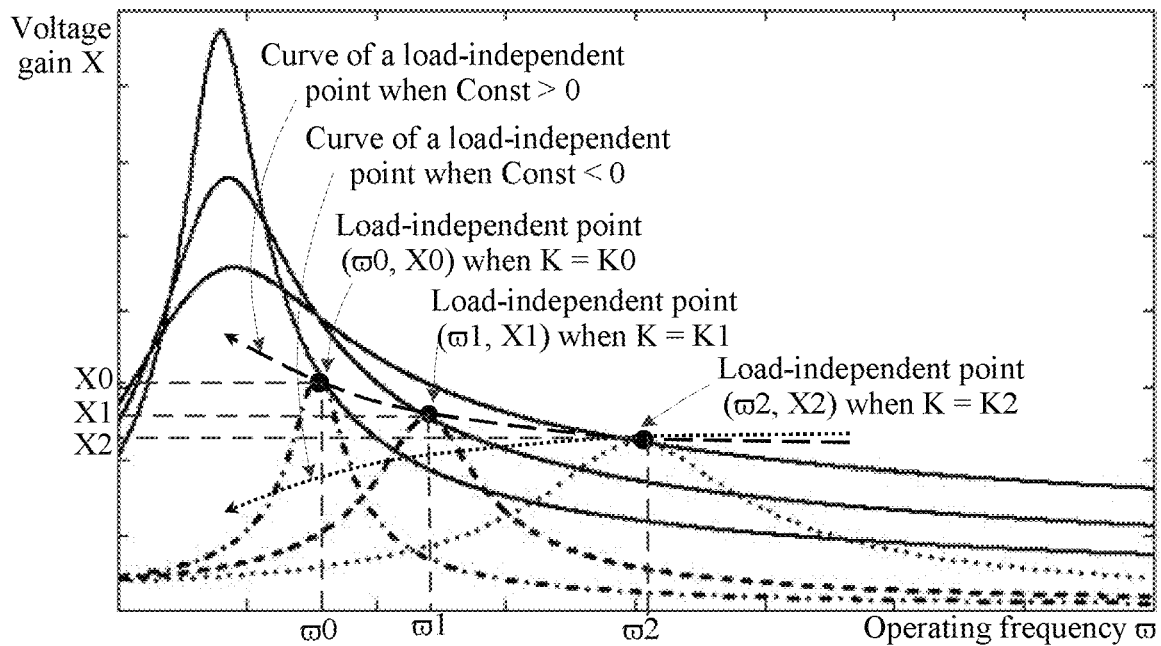
FIG. 6 is a schematic diagram of another relationship between a voltage gain and an operating frequency according to an embodiment of this application.

It can be learned from formula (6) that the load-independent point is related to Const in addition to the coupling factor. FIG. 6 is a schematic diagram of another relationship between a voltage gain and an operating frequency according to an embodiment of this application. As shown in FIG. 6, when Const>0, and values of the coupling factor K are K0, K1, and K2, respectively, corresponding load-independent points are ($\varpi$ 0, X0), ($\varpi$ 1, X1), and ($\varpi$ 2, X2), respectively. Position deviations, corresponding to the coupling factors K0, K1, and K2, between the transmitter and the receiver are s0, s1, and s2, respectively, where s0>s1>s2. It can be learned with reference to FIG. 5 and formula (6) that when Const>0, a voltage gain increases and an operating frequency decreases at the load-independent point as the position deviation increases. When Const<0, both a voltage gain and an operating frequency decrease at the load-independent point as the position deviation increases.

When Const=0, the following is obtained by substituting Const=0 into formula (6)

$$X = \sqrt{\frac{C_p}{C_s}}. \quad (7)$$

Figure 7:
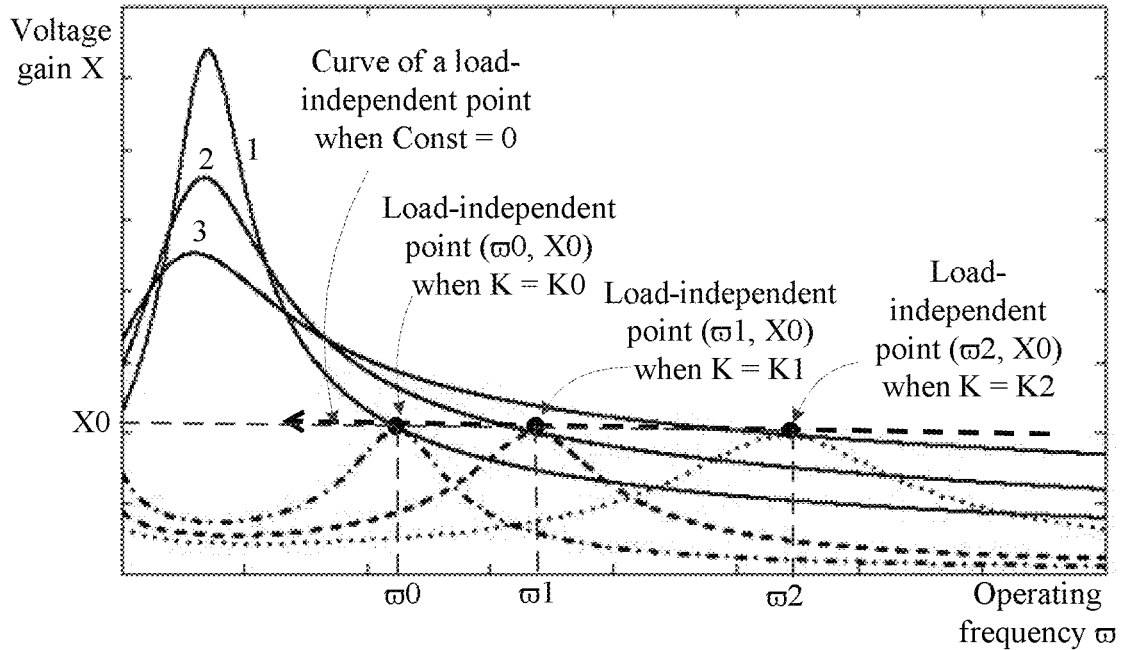
FIG. 7 is a schematic diagram of still another relationship between a voltage gain and an operating frequency according to an embodiment of this application.

It can be learned from formula (7) that when Const=0, the voltage gain at the load-independent point is invariably $\sqrt{C_p/C_s}$, and is no longer related to a coupling degree of the two coils. FIG. 7 is a schematic diagram of still another relationship between a voltage gain and an operating frequency according to an embodiment of this application. When values of the coupling factor K are K0, K1, and K2, respectively, corresponding load-independent points are ($\varpi$ 0, X0), ($\varpi$ 1, X0), and ($\varpi$ 2, X0), respectively, where $X0=\sqrt{C_p/C_s}$. Position deviations, corresponding to the coupling factors K0, K1, and K2, between the transmitter and the receiver are s0, s1, and s2, respectively, where s0>s1>s2. It can be learned that regardless of a position deviation between the transmitter and the receiver, a voltage gain at the load-independent point is invariably $X0=\sqrt{C_p/C_s}$. When Const=0, a voltage gain remains unchanged and an operating frequency gradually decreases at the load-independent point as the position deviation increases. In other words, when Const=0, the voltage gain at the load-independent point is unrelated to the position deviation between the two devices. Because Const=$L_p*C_p-L_s*C_s$=0, $C_p/C_s=L_s/L_p$, that is, the voltage gain at the load-independent point may also be expressed as $\sqrt{L_s/L_p}$.

Based on the foregoing properties of Const=0 and Const≠0, wireless charging methods in which a wireless charging system operates at a load-independent point are designed, respectively. Descriptions are separately given below.

When Const=0, a process of adjusting a wireless charging system to operate at a load-independent point is as follows. Because the voltage gain at the load-independent point is unrelated to the position deviation between the two devices when Const=0, the voltage gain is always $\sqrt{C_p/C_s}$. Based on the foregoing property, the voltage gain of the wireless charging system may be regulated to the voltage gain $\sqrt{C_p/C_s}$, at the load-independent point by regulating an operating frequency at which the transmitter transfers power to the receiver. Correspondingly, the operating frequency at which the transmitter transfers the power to the receiver is $\varpi$ 0.

When Const≠0, a process of adjusting a wireless charging system to operate at a load-independent point is as follows. When Const≠0, a voltage gain X at a load-independent point and an operating frequency $\varpi$ change with a coupling factor. However, in formula (3) and formula (6), a primary excitation inductance $L_m$ is related to a coupling factor, and $L_m$ is unknown. Therefore, when Const≠0, for the wireless charging system, the load-independent point cannot be directly obtained through calculation. A mapping relationship between a coupling factor, Const, and a load-independent point may be pre-stored, to obtain a first mapping table. The wireless charging system may first determine the coupling factor between the transmitter and the receiver based on a position deviation between the transmitter and the receiver, and query the first mapping table, to obtain a load-independent point corresponding to the current coupling factor. In addition, the wireless charging system is adjusted to operate at this load-independent point.

c. How to Set a Load-Independent Point?

In the embodiments of this application, the wireless charging system needs to be set to operate at the load-independent point when transferring power. A voltage gain between an output voltage of the receiver and an input voltage of the transmitter may be set to be invariably a voltage gain X0 at the load-independent point, and an operating frequency at which the transmitter transfers power to the receiver is the operating frequency $\varpi$ 0 at the load-independent point. In a process of setting a gain to the voltage gain X0 at the load-independent point, a voltage needs to be regulated. A voltage regulation module may be disposed in the transmitter, and is configured to regulate the input voltage of the transmitter to set the voltage gain to the voltage gain X0 at the load-independent point. Alternatively, a voltage regulation module may be disposed in the receiver, and is configured to regulate the output voltage of the receiver to set the voltage gain to the voltage gain X0 at the load-independent point. The operating frequency is regulated to the operating frequency $\varpi$ 0 at the load-independent point through closed-loop frequency conversion.

In this embodiment of this application, the voltage regulation module may be disposed in the transmitter, or the voltage regulation module may be disposed in the receiver. When Const=0, several embodiments of the methods for regulating a wireless charging system to operate at a load-independent point are provided in the embodiments of this application based on the foregoing main principle and the foregoing two manners.

When Const=0, $L_p*C_p-L_s*C_s$=0 is required in the wireless charging system. Therefore, an embodiment of this application provides a wireless charging system. As shown in FIG. 3, in the wireless charging system, circuit parameters $L_p$, $C_p$, $L_s$, and $C_s$ of a transmitter and a receiver can allow the voltage gain at the load-independent point not to change with the coupling factor. During actual operation, a position deviation slightly affects $L_p$ and $L_s$. During circuit design, $L_p$, $C_p$, $L_s$, and $C_s$ may be designed to meet $$\frac{L_p*C_p}{L_s*C_s}=k,$$

where k is a positive number that meets 0.8≤k≤1.2 in order to ensure that the wireless charging system operates near the load-independent point. It can be understood that in this embodiment of this application, the condition that k meets 0.8≤k≤1.2 is not limited. For example, it may also be 0.7≤k≤1.3. The range may be determined based on a design precision requirement of the wireless charging system. This is not limited in this application.

Specifically, for example, circuit design for the wireless charging system that includes the transmitter and the receiver renders k=1, that is, $L_p$, $C_p$, $L_s$, and $C_s$ in the wireless charging system meet $L_p*C_p-L_s*C_s$=0. For another example, circuit design for the wireless charging system that includes the transmitter and the receiver renders k=0.8, that is, $L_p$, $C_p$, $L_s$, and $C_s$ in the wireless charging system meet $L_p*C_p-0.8*L_s*C_s$=0. It should be noted that the foregoing examples are merely used to explain this embodiment of this application, and shall not be construed as a limitation.

Figure 8:
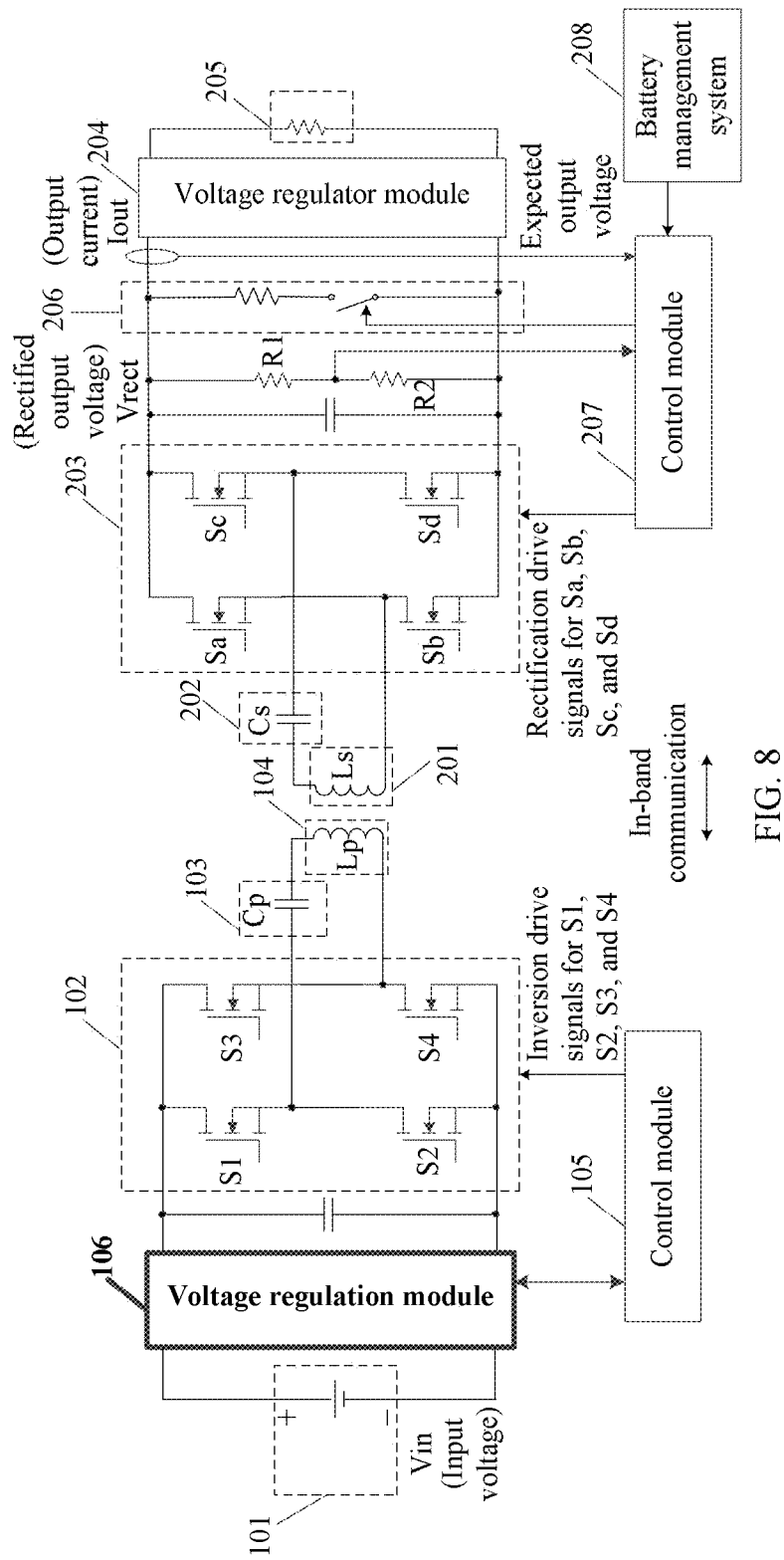
FIG. 8 is a schematic architectural diagram of another wireless charging system according to an embodiment of this application.

(1) Implementation of Wireless Charging when Const=0 and the Voltage Regulation Module is Disposed in the Transmitter FIG. 8 is a schematic architectural diagram of another wireless charging system according to an embodiment of this application. A transmitter 10 may include a DC power source 101, a DC/AC conversion module 102, a series matching capacitor (whose capacitance is $C_p$) 103, a transmitter coil 104, and a control module 105. A receiver 20 may include a receiver coil 201, a series matching capacitor (whose capacitance is $C_s$) 202, an AC/DC conversion module 203, a voltage regulator module 204, a output load 205, a modulation module 206, and a control module 207. For detailed descriptions of the foregoing modules, refer to the architecture of the wireless charging system described in FIG. 1. Details are not described herein again.

In the wireless charging system described in FIG. 8, a voltage regulation module 106 is further disposed in the transmitter, and is configured to regulate an input voltage of the transmitter, to set a voltage gain to a voltage gain X0 at a load-independent point. Specifically, the voltage regulation module 106 is configured to receive a DC voltage that is output by the DC power source 101, and receive a control signal that is output by the control module 105, to regulate the DC voltage and set the voltage gain to the voltage gain X0 at the load-independent point.

The voltage regulation module 106 may be a DC/DC output voltage regulation module or a voltage adapter circuit. The voltage regulation module 106 is a first voltage regulation module.

The receiver 20 further includes a battery management system (BMS) 208. The receiver 20 is further configured to receive an expected output voltage V_out_target sent by the BMS. The expected output voltage has the following two purposes. First, the V_out_target is used by the receiver to regulate an output voltage to the expected output voltage. Second, the expected output voltage V_out_target is further used by the transmitter to determine the input voltage of the transmitter as a first input voltage Vin_set based on the expected output voltage and the voltage gain X0 at the load-independent point, and regulate the input voltage to the first input voltage Vin_set using the voltage regulation module in the transmitter. Descriptions are separately given below.

First, regulation of the output voltage by the receiver to the expected output voltage V_out_target of the BMS is actually a closed-loop feedback regulation process. A specific regulation process is as follows. As shown in FIG. 8, the receiver uses V_out_target as a reference for the voltage regulator module 204, and adds a preset increment to obtain a preset value of Vrect. The preset increment may be obtained through a table lookup, and is used to ensure normal operation of a related chip. The receiver obtains a current output voltage Vrect of a rectifier by detecting potential of a connection point of R1 and R2, obtains an error voltage based on the preset value of Vrect and the detected current Vrect, and sends the error voltage to the transmitter through in-band communication. The transmitter can regulate Vrect by changing an operating frequency co of power transfer between the transmitter and the receiver. The receiver can finally regulate Vrect to the preset value of Vrect by repeatedly using the foregoing error voltage feedback manner. The preset value of Vrect obtained based on the expected output voltage is referred to as a first output voltage below.

Second, the expected output voltage V_out_target is used by the transmitter to determine the input voltage of the transmitter as a first input voltage Vin_set based on the expected output voltage and the voltage gain X0 at the load-independent point, which is specifically based on the schematic structural diagram of the wireless charging system described in FIG. 8.

Figure 9:
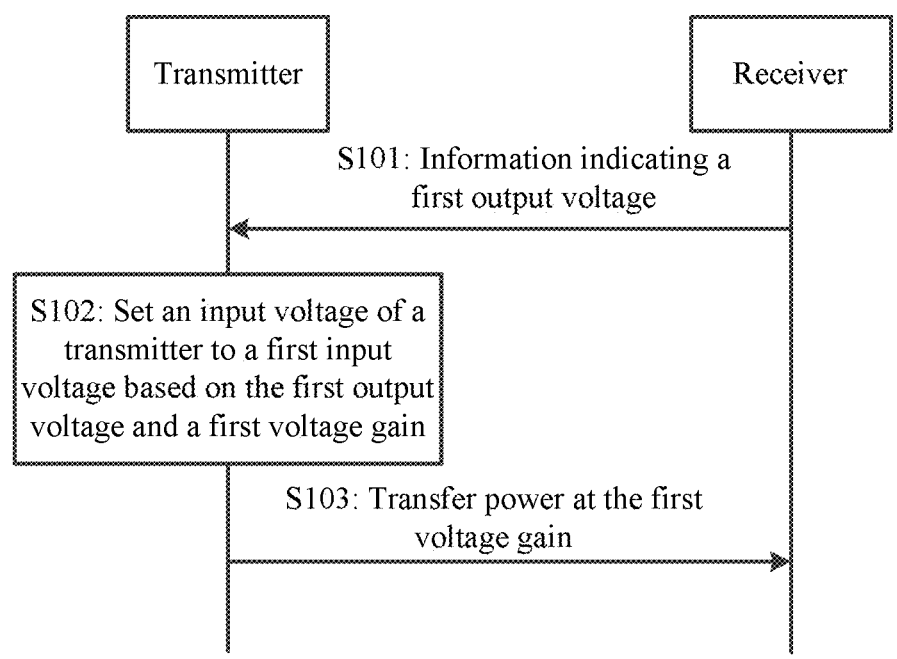
FIG. 9 is a schematic flowchart of a wireless charging method according to an embodiment of this application.

Based on the schematic structural diagram of the wireless charging system described in FIG. 8, FIG. 9 is a schematic flowchart of a wireless charging method according to an embodiment of this application. In the embodiment described in FIG. 9, a voltage gain X0 at a load-independent point ($\varpi$ 0, X0) of the wireless charging system is a first voltage gain. Regardless of a value of a coupling factor, the voltage gain X0 at the load-independent point is the first voltage gain. The wireless charging method may include the following steps.

S101. A receiver sends, to a transmitter, information that indicates a first output voltage. The first output voltage is an expected output voltage of the receiver.

S102. The transmitter sets an input voltage of the transmitter to a first input voltage based on the first output voltage and a first voltage gain.

S103. The transmitter transfers power to the receiver at the first voltage gain.

Actually, when the transmitter transfers the power to the receiver at the first voltage gain, because the first voltage gain is the voltage gain at the load-independent point, an operating frequency at which the transmitter transfers the power to the receiver is a first operating frequency, and the input voltage of the transmitter is the first input voltage.

The expected output voltage of the receiver is sent by a BMS to a control module 207. Actually, regulation of the input voltage of the transmitter to the first input voltage is also a closed-loop feedback regulation process. A specific process is as follows. The input voltage of the transmitter is gradually regulated based on the first input voltage. A change in the input voltage of the transmitter may cause an output voltage of the receiver to deviate from the first output voltage. A deviation of the output voltage of the receiver causes the receiver to start closed-loop feedback circuit regulation of the first output voltage again, to regulate the output voltage to the expected output voltage, causing the transmitter to regulate an operating frequency of power transfer. After the foregoing closed-loop feedback regulation process, the input voltage of the transmitter is finally regulated to the first input voltage, the voltage gain is the voltage gain X0 at the load-independent point, and the operating frequency of the power transfer is exactly the operating frequency $\varpi$ 0 at the load-independent point.

It should be noted that, in this embodiment of this application, the input voltage of the transmitter is an output voltage of a voltage regulation module 106 in the transmitter. The output voltage of the receiver is an output voltage Vrect of the AC/DC conversion module 203 in the receiver. In this embodiment of this application, the voltage gain X0 at the load-independent point is the first voltage gain.

In this embodiment of this application, the voltage gain at the load-independent point of the wireless charging system is constant. To ensure that the wireless charging system operates at the load-independent point, a capacitance $C_p$ of a series matching capacitor of the transmitter, a self-inductance $L_p$ applied when a transmitter coil transfers power to the receiver, a capacitance $C_s$ of a series matching capacitor of the receiver, and a self-inductance $L_s$ applied when a receiver coil receives the power transferred by the transmitter need to be designed such that the foregoing parameters meet $$\frac{L_p * C_p}{L_s * C_s} = k,$$

where k is a positive number that meets 0.8≤k≤1.2.

However, in an actual circuit, considering factors such as circuit losses, when the voltage gain at the load-independent point is set, the voltage gain may be increased or decreased by an offset. The first voltage gain X0 may be a positive number that meets $0.8*\sqrt{L_s/L_p} \leq X0 \leq 1.2*\sqrt{L_s/L_p}$. For example, a voltage gain value at the load-independent point is set to $\sqrt{C_p/C_s}$ (1+20%) or $\sqrt{C_p/C_s}$ (1−20%). It can be understood that in this embodiment of this application, an offset specified for the voltage gain is not limited. For example, alternatively, the first voltage gain may be set to $\sqrt{C_p/C_s}$ (1+30%) or $\sqrt{C_p/C_s}$ (1−30%). The range may be determined based on a design precision requirement of the wireless charging system. This is not limited in this application.

Regardless of the value of the coupling factor, the voltage gain at the load-independent point is invariably $\sqrt{C_p/C_s}$. The voltage gain is set to be within a range of $0.8*\sqrt{L_s/L_p} \leq X \leq 1.2*\sqrt{L_s/L_p}$ or within a range of $0.8*\sqrt{C_p/C_s} \leq X \leq 1.2*\sqrt{C_p/C_s}$ such that the wireless charging system operates near the load-independent point, and the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

The first output voltage may be the expected output voltage of the BMS in the receiver. During wireless charging, the expected output voltage of the BMS in the receiver may change. The expected output voltage of the BMS may be affected by factors such as a quantity of electricity of the receiver. For example, the voltage gain at the load-independent point is 1.1. If the receiver has a relatively small quantity of electricity (which may be lower than a threshold), the expected output voltage of the BMS in the receiver may be 9.9 volts (V). The receiver feeds back a difference between a current output voltage and a specified output voltage to the transmitter through a closed-loop circuit. The transmitter regulates an operating frequency when receiving the voltage difference. An output voltage of the voltage regulator module in the receiver is regulated to 9.9 V through the foregoing closed-loop regulation process. In addition, the receiver sends the expected output voltage 9.9 V of the BMS to the transmitter, and the transmitter determines, through calculation based on the expected output voltage 9.9 V of the BMS and the voltage gain of 1.1, that the input voltage of the transmitter is 9 V. Therefore, the transmitter gradually regulates the input voltage of the transmitter using the voltage regulation module, and a change in the input voltage of the transmitter causes the output voltage of the receiver to deviate from 9.9 V. When the receiver detects that the output voltage of the receiver deviates from 9.9 V, the receiver starts the closed-loop circuit to feed back the difference between the current output voltage and the specified output voltage to the transmitter, and the transmitter re-regulates the operating frequency based on the voltage difference. After the foregoing closed-loop circuit regulation is completed, the input voltage of the transmitter is 9 V, the output voltage of the receiver is 9.9 V, the voltage gain is 1.1, and the operating frequency is exactly the operating frequency at the load-independent point.

After the wireless charging continues for a period of time, if the receiver has a relatively large quantity of electricity (which may be higher than another threshold), the expected output voltage of the BMS may be 5.5 V. The current output voltage of the receiver is still 9.9 V, and then the receiver may repeat the foregoing closed-loop circuit regulation process. The input voltage of the transmitter is finally adjusted to 5 V, the output voltage of the receiver is regulated to 5.5 V, the voltage gain is 1.1, and the operating frequency is exactly the operating frequency at the load-independent point.

When the wireless charging system performs power transfer at the load-independent point, if the receiver moves, a position deviation between the receiver and the transmitter changes, and then a coupling factor between an inductor coil of the transmitter and an inductor coil of the receiver changes. As shown in FIG. 7, if the coupling factor applied before the receiver moves is K0, the wireless charging system operates at the load-independent point ($\varpi 0$, X0). If the coupling factor applied after the receiver moves is K1, the load-independent point of the wireless charging system becomes ($\varpi 1$, X0). After the receiver moves, as shown in FIG. 7, a $\varpi$ –X curve 1 becomes a $\varpi$ –X curve 2. Because the operating frequency is still $\varpi 0$, a corresponding voltage gain increases, and the output voltage deviates from the expected output voltage of the BMS. The receiver may perform the closed-loop circuit regulation process. For a specific process, refer to detailed descriptions in step S104. Details are not described herein again. After the closed-loop circuit regulation is completed, the voltage gain is brought back to X0, the corresponding operating frequency is $\varpi 1$, and the wireless charging system operates at the load-independent point ($\varpi 1$, X0) corresponding to the coupling factor K1.

It should be understood that the examples are merely used to explain this embodiment of this application, and shall not be construed as a limitation.

In this embodiment of this application, the first input voltage is obtained by dividing the first output voltage by the first voltage gain. The first voltage gain may be sent by the receiver to the transmitter. The receiver may obtain the first voltage gain through calculation based on $C_p$ and $C_s$ (or $L_s$ and $L_p$) and send the first voltage gain to the transmitter. Alternatively, the receiver may preset a voltage gain and send the voltage gain to the transmitter. Alternatively, the first voltage gain may be obtained by the receiver through calculation based on $C_p$ and $C_s$ (or $L_s$ and $L_p$), and the transmitter may receive in advance information sent by the receiver and indicating $C_s$ or information sent by the receiver and indicating $L_s$. $C_s$ ($L_s$) and the first output voltage may be indicated by a same piece of information, or may be indicated by different pieces of information. This is not limited in this application.

In the foregoing description, the voltage regulation module is disposed in the transmitter, and the transmitter regulates the voltage gain to the voltage gain at the load-independent point by regulating the input voltage such that the wireless charging system finally operates at the load-independent point. Alternatively, the voltage regulation module may be disposed in the receiver, which is described in detail below.

The wireless charging system operates near the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

The voltage gain at the load-independent point is also unrelated to the coupling factor. In other words, during wireless charging, regardless of a position deviation between the transmitter and the receiver, the voltage gain at the load-independent point is invariably $\sqrt{C_p/C_s}$. During a process of regulating the wireless charging system to operate at the load-independent point, it is only required to regulate the voltage gain between the output voltage of the receiver and the input voltage of the transmitter to be close to $\sqrt{C_p/C_s}$, and the operating frequency at which the wireless charging system performs power transfer may be regulated to the operating frequency at the load-independent point under an effect of a closed-loop circuit such that the wireless charging system can operate at the load-independent point. It can be learned that regardless of the position deviation between the transmitter and the receiver, it is only required to regulate the voltage gain between the output voltage of the receiver and the input voltage of the transmitter to be close to $\sqrt{C_p/C_s}$, and convenience for regulating the wireless charging system to operate at the load-independent point can be improved.

Figure 10:
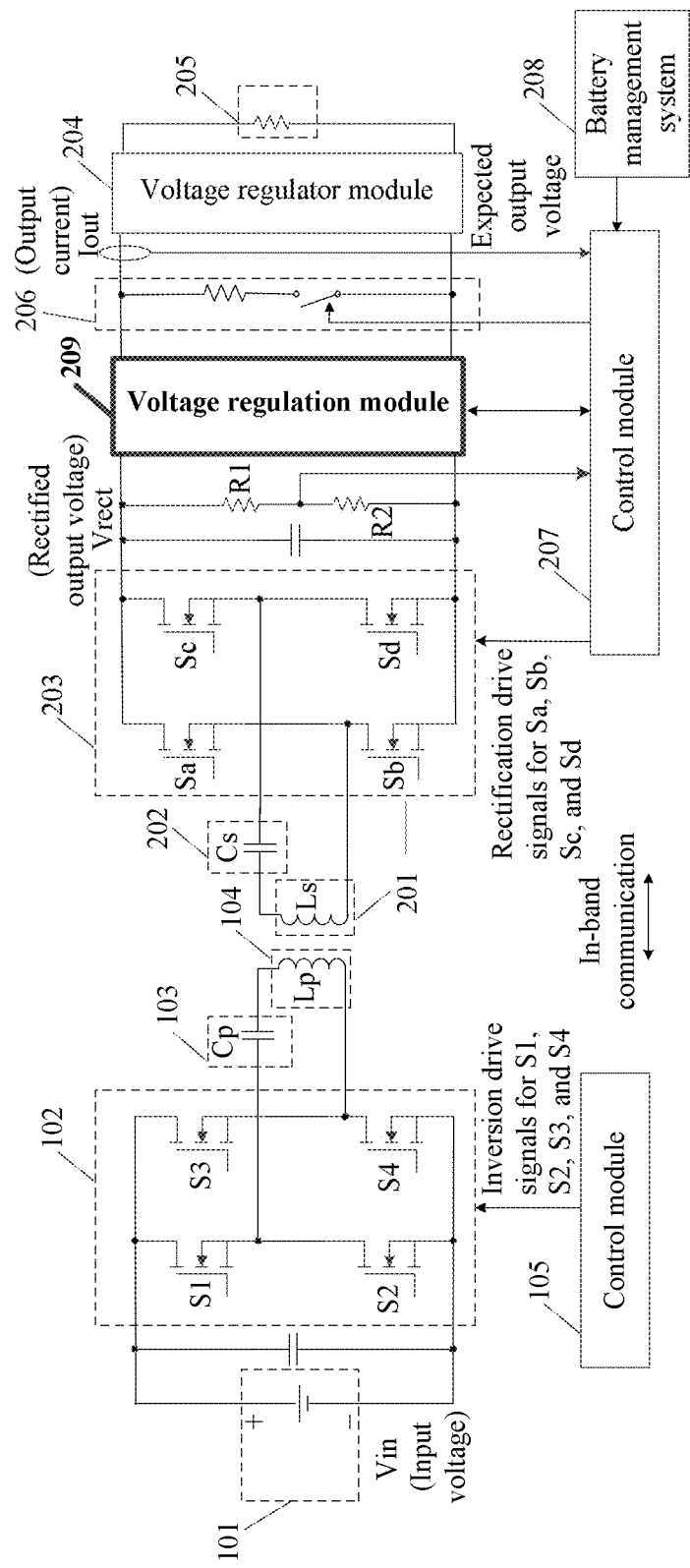
FIG. 10 is a schematic structural diagram of still another wireless charging system according to an embodiment of this application.

(2) Implementation of Wireless Charging when Const=0 and the Voltage Regulation Module is Disposed in the Receiver FIG. 10 is a schematic structural diagram of still another wireless charging system according to an embodiment of this application. A transmitter 10 may include a DC power source 101, a DC/AC conversion module 102, a series matching capacitor (whose capacitance is Cp) 103, a transmitter coil 104, and a control module 105. A receiver 20 may include a receiver coil 201, a series matching capacitor (whose capacitance is $C_s$) 202, an AC/DC conversion module 203, a voltage regulator module 204, a output load 205, a modulation module 206, a control module 207, and a BMS 208. For detailed descriptions of the foregoing modules, refer to the architectures of the wireless charging systems described in FIG. 1 and FIG. 8. Details are not described herein again. The series matching capacitor 103 is a first series matching capacitor, and the series matching capacitor (whose capacitance is $C_s$) 202 is a second series matching capacitor.

In the wireless charging system described in FIG. 10, a voltage regulation module 209 is further disposed in the receiver, and is configured to regulate an output voltage of the receiver, to set a voltage gain to a voltage gain X0 at a load-independent point. Specifically, the voltage regulation module 209 is configured to receive a voltage that is output by the AC/DC conversion module 203, and receive a control signal that is output by the control module 207, to regulate the voltage and set the voltage gain to the voltage gain X0 at the load-independent point. The voltage regulation module 209 is a second voltage regulation module.

A process in which the receiver regulates the output voltage of the receiver to the first output voltage is also a closed-loop feedback regulation process. A specific process is as follows. The output voltage of the receiver is gradually regulated based on the first output voltage. The receiver obtains a voltage difference based on calculation of the first output voltage and the current output voltage of the voltage regulation module of the receiver, and sends the voltage difference to the transmitter through in-band communication. The transmitter regulates the operating frequency based on the voltage difference. After the foregoing closed-loop feedback regulation process, when the regulation is completed, the output voltage of the receiver is finally regulated to the first output voltage, the voltage gain is the voltage gain X0 at the load-independent point, and the operating frequency of the power transfer is exactly the operating frequency $\varpi$ 0 at the load-independent point.

Figure 11:
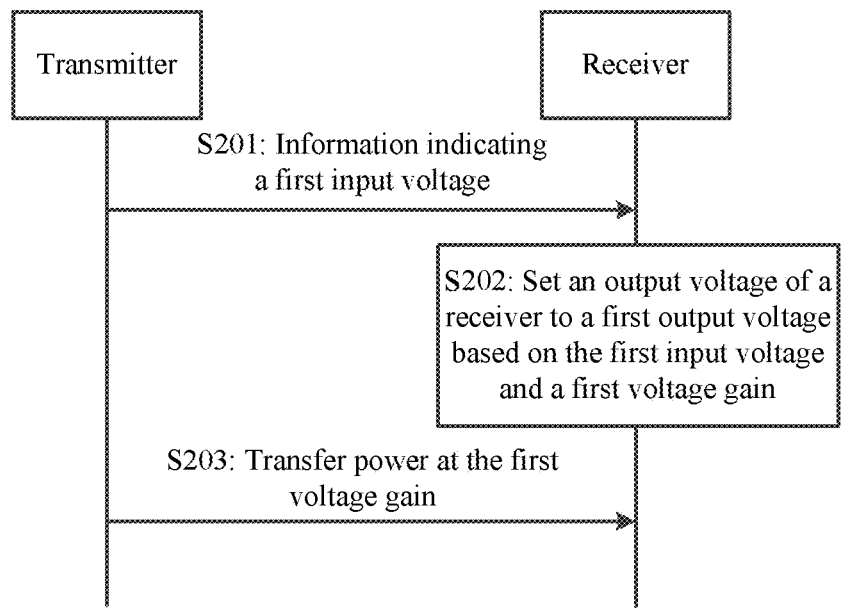
FIG. 11 is a schematic flowchart of another wireless charging method according to an embodiment of this application.

Based on the schematic structural diagram of the wireless charging system described in FIG. 10, FIG. 11 is a schematic flowchart of another wireless charging method according to an embodiment of this application. In this embodiment described in FIG. 11, a voltage gain at a load-independent point ($\varpi$ 0, X0) of the wireless charging system is a constant X0. Regardless of a value of a coupling factor, the voltage gain at the load-independent point is X0. The wireless charging method may include the following steps.

S201. A transmitter sends, to a receiver, information that indicates a first input voltage. The first input voltage is an input voltage of the transmitter.

S202. The receiver sets an output voltage of the receiver to a first output voltage based on the first input voltage and a first voltage gain.

S203. The transmitter transfers power to the receiver at the first voltage gain.

Actually, when the transmitter transfers the power to the receiver at the first voltage gain, because the first voltage gain is the voltage gain at the load-independent point, an operating frequency at which the transmitter transfers the power to the receiver is a first operating frequency, and the output voltage of the receiver is the first output voltage.

When the receiver regulates the output voltage to the first output voltage and the voltage gain is $\sqrt{C_p/C_s}$, the transmitter regulates an operating frequency of power transfer to the operating frequency at the load-independent point through closed-loop feedback regulation. In this case, the wireless charging system operates at the load-independent point.

However, in an actual circuit, considering factors such as circuit losses, when the voltage gain at the load-independent point is set, the voltage gain may be increased or decreased by an offset. The first voltage gain X0 may be a positive number that meets $0.8*\sqrt{L_s/L_p} \le X0 \le 1.2*\sqrt{L_s/L_p}$. For example, a voltage gain value at the load-independent point is set to $\sqrt{C_p/C_s}$ (1+20%) or $\sqrt{C_p/C_s}$(1−20%). It can be understood that in this embodiment of this application, an offset specified for the voltage gain is not limited. For example, alternatively, the first voltage gain may be set to $\sqrt{C_p/C_s}$ (1+30%) or $\sqrt{C_p/C_s}$ (1−30%). The range may be determined based on a design precision requirement of the wireless charging system. This is not limited in this application.

Before step S201, the transmitter may receive information sent by the receiver and indicating the first output voltage, and determine the input voltage of the transmitter as the first input voltage based on the first output voltage. The transmitter may determine the first input voltage based on a pre-stored second mapping table. The second mapping table includes at least one output voltage and an input voltage of the transmitter corresponding to each of the at least one output voltage. When the input voltage of the transmitter is the input voltage of the transmitter corresponding to each output voltage, the wireless charging system is regulated to operate at the load-independent point, and the output voltage of the receiver is each output voltage. In this case, the first output voltage meets the expected output voltage of the BMS in the receiver.

During a charging process of the wireless charging system, if the expected output voltage of the BMS in the receiver varies in different charging phases, the transmitter is also required to include a voltage regulation module. For the voltage regulation module, refer to the voltage regulation module 106 in the transmitter in the embodiment described in FIG. 8. The voltage regulation module is configured to regulate the input voltage of the transmitter to the first input voltage after the transmitter determines the input voltage of the transmitter as the first input voltage based on the first output voltage.

When the wireless charging system performs power transfer at the load-independent point, if the receiver moves, a position deviation between the receiver and the transmitter changes, and then a coupling factor between an inductor coil of the transmitter and an inductor coil of the receiver changes. As shown in FIG. 7, if the coupling factor applied before the receiver moves is K0, the wireless charging system operates at the load-independent point ($\varpi$ 0, X0). If the coupling factor applied after the receiver moves is K1, the load-independent point of the wireless charging system becomes ($\varpi$ 1, X0). After the receiver moves, as shown in FIG. 7, a $\varpi$ –X curve 1 becomes a $\varpi$ –X curve 2. Because the operating frequency is still $\varpi$ 0, a corresponding voltage gain increases, and the output voltage deviates from the expected output voltage of the BMS. The receiver may perform the closed-loop circuit regulation process. For a specific process, refer to detailed descriptions in step S104. Details are not described herein again. After the closed-loop circuit regulation is completed, the voltage gain is brought back to X0, the corresponding operating frequency is and the wireless charging system operates at the load-independent point ($\varpi$ 1, X0) corresponding to the coupling factor K1.

In this embodiment of this application, the first output voltage is obtained by multiplying the first input voltage by the first voltage gain. The first voltage gain may be sent by the transmitter to the receiver. The transmitter may obtain the first voltage gain through calculation based on $C_p$ and $C_s$ (or $L_s$ and $L_p$) and send the first voltage gain to the receiver. Alternatively, the first voltage gain may be obtained by the transmitter through calculation based on $C_p$ and $C_s$ (or $L_s$ and $L_p$). The receiver may receive in advance information sent by the transmitter and indicating $C_p$ or information sent by the transmitter and indicating $L_p$. $C_p$ ($L_p$) and the first input voltage may be indicated by a same piece of information, or may be indicated by different pieces of information. This is not limited in this application.

The wireless charging system operates near the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved.

The voltage gain at the load-independent point is also unrelated to the coupling factor. In other words, during wireless charging, regardless of a position deviation between the transmitter and the receiver, the voltage gain at the load-independent point is invariably $\sqrt{C_p/C_s}$. During a process of regulating the wireless charging system to operate at the load-independent point, it is only required to regulate the voltage gain between the output voltage of the receiver and the input voltage of the transmitter to be close to $\sqrt{C_p/C_s}$, and the operating frequency at which the wireless charging system performs power transfer may be regulated to the operating frequency at the load-independent point under an effect of a closed-loop circuit such that the wireless charging system can operate at the load-independent point. It can be learned that regardless of the position deviation between the transmitter and the receiver, it is only required to regulate the voltage gain between the output voltage of the receiver and the input voltage of the transmitter to be close to $\sqrt{C_p/C_s}$, and convenience for regulating the wireless charging system to operate at the load-independent point can be improved.

During design of the wireless charging system, a capacitance and an inductance may be designed based on a desired voltage gain. During charging, the voltage gain of the wireless charging system is set to the voltage gain corresponding to the load-independent point, that is, the first voltage gain. The wireless charging system operates at the load-independent point. A change in an output resistance of the receiver does not affect the operating frequency of power transfer, and the change in the output resistance of the receiver does not cause a change in the voltage gain, either. Therefore, the output voltage of the receiver is constant, and an output voltage jump caused by an output resistance jump of the receiver is reduced, thereby reducing electrical energy consumed by the voltage regulator module and improving charging efficiency. Table 1 is an output voltage jump test result of a load jump at ($\varpi$ 0, X0).

TABLE 1

Test result of an output voltage jump caused by a load jump at ($\varpi$ 0, X0) Resistance jump

| Voltage jump Capacitance design | Current jump 0.3 amps (A)→1.25 A caused by a load jump | Current jump 1.25 A→0.3 A caused by a load jump |
|---|---|---|
| Design values of $C_p$ and $C_s$ meet X0 = $\sqrt{C_p/C_s}$ | 0.65 V | 0.66 V |
| A design value of $C_p$ or $C_s$ deviates 50% | 4.8 V | 3.6 V |

In Table 1, when design values of $C_p$ and $C_s$ meet X0=$\sqrt{C_p/C_s}$, the wireless charging system operates at the load-independent point, two jumps of a current of the receiver between 0.3 A and 1.25 A due to the output resistance jump in the receiver cause corresponding fluctuation of 0.65 V and 0.66 V in the output voltage of the receiver. When design values of $C_p$ and $C_s$ do not meet X0=$\sqrt{C_p/C_s}$, that is, the wireless charging system does not operate at the load-independent point, two jumps of a current of the receiver between 0.3 A and 1.25 A due to the output resistance jump in the receiver cause corresponding fluctuation of 4.8 V and 3.6 V in the output voltage of the receiver. It can be learned that, the output voltage jump caused by the output resistance jump of the receiver can be reduced by setting the wireless charging system to operate at the load-independent point, thereby reducing electrical energy consumed by the voltage regulator module and improving charging efficiency.

In this embodiment of this application, actually, when Const≠0, the wireless charging system can also be designed to operate at the load-independent point. When the circuit parameters $L_p$, $C_p$, $L_s$, and $C_s$ of the transmitter and the receiver do not meet Const=0, the voltage gain at the load-independent point is no longer invariably $\sqrt{C_p/C_s}$, and the voltage regulation module may be disposed in the transmitter, or the voltage regulation module may be disposed in the receiver. Several embodiments of the methods for regulating a wireless charging system to operate at a load-independent point are separately provided in the embodiments of this application based on the foregoing two manners.

Figure 12:
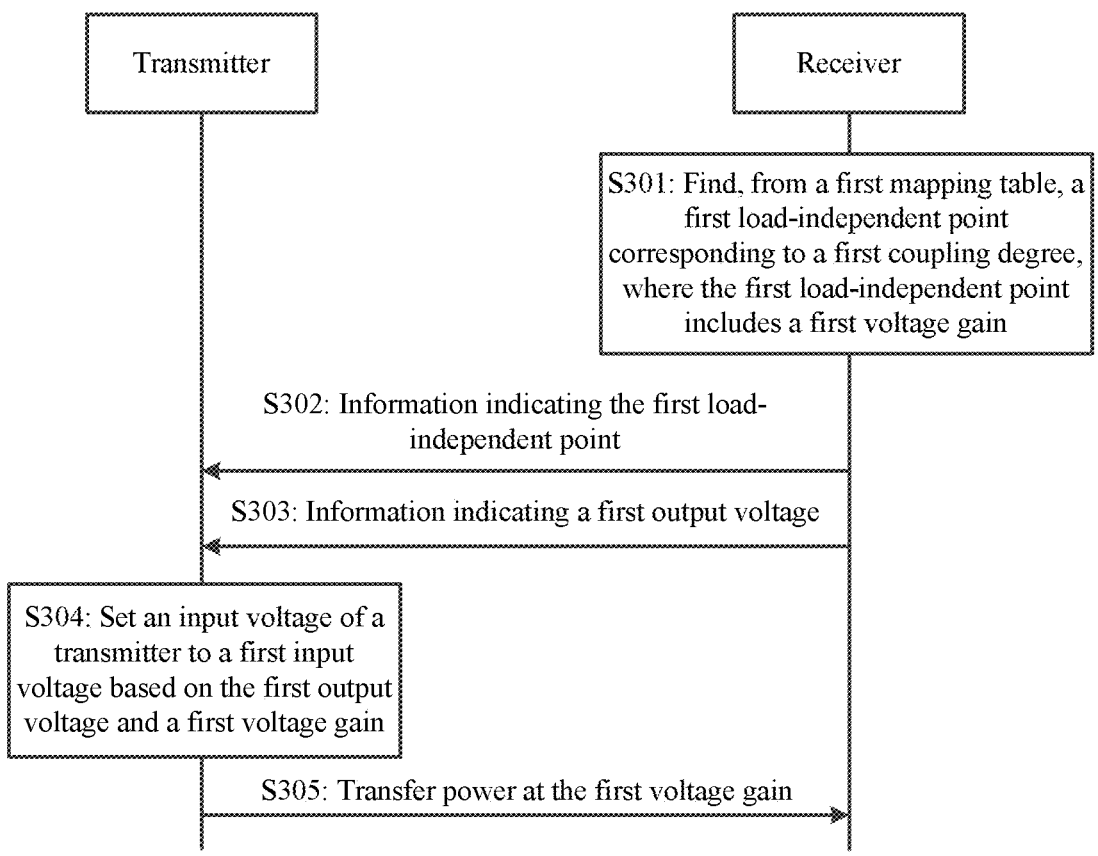
FIG. 12 is a schematic flowchart of still another wireless charging method according to an embodiment of this application.

(1) Implementation of wireless charging when Const≠0 and the voltage regulation module is disposed in the transmitter Based on the schematic structural diagram of the wireless charging system described in FIG. 8, FIG. 12 is a schematic flowchart of still another wireless charging method according to an embodiment of this application. In this embodiment described in FIG. 12, a voltage gain X0 at a load-independent point ($\varpi 0$, X0) of the wireless charging system is related to a coupling factor. The wireless charging method may include the following steps.

S301. A receiver finds, from a first mapping table, a first load-independent point corresponding to a first coupling degree, where the first load-independent point includes a first voltage gain.

S302. The receiver sends, to a transmitter, information that indicates the first load-independent point.

S303. The receiver sends, to the transmitter, information that indicates a first output voltage.

S304. The transmitter sets an input voltage of the transmitter to a first input voltage based on the first output voltage and a first voltage gain.

S305. The transmitter transfers power to the receiver at the first voltage gain.

Actually, when the transmitter transfers the power to the receiver at the first voltage gain, because the first voltage gain is the voltage gain at the load-independent point, an operating frequency at which the transmitter transfers the power to the receiver is a first operating frequency, and the input voltage of the transmitter is the first input voltage.

In this embodiment of this application, the receiver may pre-store the first mapping table, the first mapping table may include at least one coupling degree and a load-independent point corresponding to each of the at least one coupling degree, and the load-independent point is a combination of a voltage gain and an operating frequency. At an operating frequency in a load-independent point corresponding to each coupling degree, a voltage gain in the load-independent point corresponding to the coupling degree is independent of an output load of the receiver. The foregoing coupling degree may be a coupling factor or a mutual inductance. The coupling factor is described as an example below.

The first mapping table may have two forms depending on whether Const is known. Descriptions are separately given below.

(a) Const is known.

If $C_p$ and $L_p$ of the transmitter are known to the receiver, or $C_s$ and $L_s$ of the receiver are known to the transmitter, $L_p*C_p-L_s*C_s$=Const is known. For the known Const, different coupling factors may be preset to measure a load-independent point. For example, a position deviation is changed at fixed steps to test or calculate a corresponding coupling factor and a load-independent point corresponding to the coupling factor. For details, refer to Table 2. Table 2 is a schematic diagram of a first mapping table according to an embodiment of this application.

TABLE 2

Example of a first mapping table (Const = Const 0)

| Position deviation s | Coupling factor K | Load-independent point (X, $\varpi$) |
|---|---|---|
| s0 | K0 | (X0, $\varpi$0) |
| s1 | K1 | (X1, $\varpi$1) |
| s2 | K2 | (X2, $\varpi$2) |
| ... | ... | ... |
| sn | Kn | (Xn, $\varpi$m) |

As shown in Table 2, Const corresponding to the transmitter and the receiver is Const 0. In this case, a coupling factor Ku corresponding when the position deviation s is su (u=0, 1, 2, . . . , n), and a load-independent point (Xu, $\varpi$) may be tested and stored in advance, where n and u both are natural numbers.

The receiver may pre-store the foregoing first mapping table. When the transmitter transfers power to the receiver, the receiver finds a corresponding load-independent point based on a detected position deviation between the receiver and the transmitter, and then, sends the found load-independent point to the receiver. For example, if the receiver detects that a current position deviation between the receiver and the transmitter is s2, the receiver determines, through a table lookup based on the foregoing pre-stored first mapping table, that a coupling factor is K2 and a load-independent point is (X2, $\varpi$2).

In addition, when the voltage gain and the input voltage of the transmitter are regulated, the operating frequency $\varpi$ is regulated using a closed-loop circuit. This is passive regulation, and there is no need to know a specific value of the operating frequency $\varpi$. To reduce a stored data amount and save storage space, the receiver may alternatively pre-store only the voltage gain X at the load-independent point in the first mapping table. For details, refer to Table 3. Table 3 is a schematic diagram of another first mapping table according to an embodiment of this application.

TABLE 3

Example of a first mapping table (Const = Const 0)

| Position deviation s | Coupling factor K | Voltage gain X at a load-independent point |
|---|---|---|
| s0 | K0 | X0 |
| s1 | K1 | X1 |
| s2 | K2 | X2 |
| ... | ... | ... |
| sn | Kn | Xn |

As shown in Table 3, Const corresponding to the transmitter and the receiver is Const 0. A coupling factor Ku corresponding when the position deviation s is su (u=0, 1, 2, . . . , n), and a voltage gain Xu at a load-independent point is tested and stored in advance, where n and u both are natural numbers.

The receiver may pre-store the foregoing first mapping table. When the transmitter transfers power to the receiver, the receiver finds a corresponding voltage gain at a load-independent point based on a detected position deviation between the receiver and the transmitter, and then, sends the found voltage gain at the load-independent point to the transmitter. For example, if the receiver detects that a current position deviation between the receiver and the transmitter is s2, the receiver determines, through a table lookup based on the foregoing pre-stored first mapping table, that a coupling factor is K2 and a voltage gain at a load-independent point is X2.

After the receiver finds the voltage gain at the load-independent point, the receiver or the transmitter can alternatively calculate the operating frequency at the load-independent point based on formula (3) and formula (6).

(b) Const is unknown.

If the transmitter by which the receiver is charged is unknown, or the receiver charged by the transmitter is unknown, that is, $C_p$ and $L_p$ of the transmitter are unknown to the receiver, or $C_s$ and $L_s$ of the receiver are unknown to the transmitter, a value of Const may be changed at fixed steps to test different coupling factors under different Const and load-independent points corresponding to the coupling factors. Load-independent points corresponding to different Const and coupling factors K may be pre-stored. For details, refer to Table 4. Table 4 is an example of still another first mapping table according to an embodiment of this application.

TABLE 4

Example of a first mapping table (Const is unknown)

| Load-independent point | Position deviation | | | | |
|---|---|---|---|---|---|
| Const | s0 | s1 | s2 | ... | sn |
| Const 0 | (X00, ω00) | (X01, ω01) | (X02, ω02) | ... | (X0n, ω0n) |
| Const 1 | (X10, ω10) | (X11, ω11) | (X12, ω12) | ... | (X1n, ω1n) |
| Const 2 | (X20, ω20) | (X21, ω21) | (X22, ω22) | ... | (X2n, ω2n) |
| ... | ... | ... | ... | ... | ... |
| Const m | (Xm0, ωn0) | (Xm1, ωn1) | (Xm2, ωm2) | ... | (Xmn, ωmn) |

As shown in Table 4, a load-independent point (Xvu, ω vu) corresponding when the position deviation s is su (u=0, 1, 2, ..., n), and Const is Const v (v=0, 1, 2, ..., m) is tested and stored in advance, where m, n, u, and v all are natural numbers.

The receiver may pre-store the foregoing first mapping table. When the transmitter transfers power to the receiver, the receiver may first obtain $L_p$ and $C_p$ of the transmitter, and obtain Const through calculation. The receiver finds a corresponding load-independent point based on Const obtained through calculation and a detected position deviation between the receiver and the transmitter, and then, sends the found load-independent point to the transmitter. For example, if Const obtained by the receiver through calculation is Const 1, and the receiver detects that a current position deviation between the receiver and the transmitter is s2, the receiver determines, through a table lookup based on the foregoing pre-stored first mapping table, that the load-independent point is (X12, ω 12).

Certainly, to save storage space, the receiver may alternatively pre-store only the voltage gain X at the load-independent point in the first mapping table. For details, refer to Table 5. Table 5 is a schematic diagram of yet another first mapping table according to an embodiment of this application.

TABLE 5

Example of a first mapping table (Const is unknown)

| Gain X | Position deviation s | | | | |
|---|---|---|---|---|---|
| Const | s0 | s1 | s2 | ... | sn |
| Const 0 | X00 | X01 | X02 | ... | X0n |
| Const 1 | X10 | X11 | X12 | ... | X1n |
| Const 2 | X20 | X21 | X22 | ... | X2n |
| ... | ... | ... | ... | ... | ... |
| Const m | Xm0 | Xm1 | Xm2 | ... | Xmn |

As shown in Table 5, a voltage gain Xvu at a load-independent point corresponding when the position deviation s is su (u=0, 1, 2, ..., n) and Const is Const v (v=0, 1, 2, ..., m) is tested and stored in advance, where m, n, u, and v all are natural numbers.

The receiver may pre-store the foregoing first mapping table. When the transmitter transfers power to the receiver, the receiver may first obtain $L_p$ and $C_p$ of the transmitter, and obtain Const through calculation. The receiver finds a corresponding voltage gain at a load-independent point based on Const obtained through calculation and a detected position deviation between the receiver and the transmitter, and then, sends the found voltage gain at the load-independent point to the transmitter. For example, if Const obtained by the receiver through calculation is Const 1, and the receiver detects that a current position deviation between the receiver and the transmitter is s2, the receiver determines, through a table lookup based on the foregoing pre-stored first mapping table, that the voltage gain at the load-independent point is X12.

Because the receiver is usually a mobile terminal and has very high data storage and processing capabilities, if the first mapping table is stored in the receiver, load on the transmitter for data processing and storage can be reduced, a table lookup speed can be accelerated, and a delay for regulating a load-independent point can be reduced. Certainly, the foregoing first mapping table may be alternatively stored in the transmitter. The transmitter can directly obtain the load-independent point through a table lookup, and the load-independent point does not need to be sent using the receiver. In-band communication may be reduced, and signaling overheads may be reduced.

When Const≠0 and the expected output voltage of the BMS in the receiver changes, neither of the voltage gain nor the operating frequency at the load-independent point changes. The receiver or the transmitter does not need to query the first mapping table again, and only needs to repeat steps S303 to S305, to re-regulate the wireless charging system to operate at the load-independent point based on the changed first output voltage and the voltage gain of the load-independent point.

When Const≠0 and the wireless charging system operates at the load-independent point, if the position deviation between the transmitter and the receiver changes, for example, a charging position of the transmitter changes, the coupling factor changes, and the voltage gain and the operating frequency at the load-independent point of the wireless charging system also change. The load-independent point needs to be determined again, and the wireless charging system is regulated to operate at the load-independent point, that is, steps S301 to S305 are repeated based on a new coupling factor obtained after the position deviation changes.

However, in an actual circuit, considering factors such as circuit losses, after the voltage gain X0 at the load-independent point corresponding to the coupling factor is found, when the voltage gain is set, the voltage gain may be set to the voltage gain X0 at the load-independent point plus or minus an offset. For example, the voltage gain is set to the first voltage gain X0, and the first voltage gain X0 may be a positive number that meets $0.8*\sqrt{L_s/L_p} \leq X0 \leq 1.2*\sqrt{L_s/L_p}$. For example, a voltage gain value at the load-independent point is set to $\sqrt{C_p/C_s}$ (1+20%) or $\sqrt{C_p/C_s}$ (1−20%). It can be understood that in this embodiment of this application, an offset specified for the voltage gain is not limited. For example, alternatively, the first voltage gain may be set to $\sqrt{C_p/C_s}$ (1+30%) or $\sqrt{C_p/C_s}$ (1−30%). The range may be determined based on a design precision requirement of the wireless charging system. This is not limited in this application.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

It can be learned that the first voltage gain at the load-independent point is determined in the foregoing manner of looking up the first mapping table, and the circuit parameters in the transmitter and the receiver do not necessarily need to meet $$\frac{L_p * C_p}{L_s * C_s} = k,$$

where k is a positive number that meets 0.8≤k≤1.2. In this way, the wireless charging system can be set at the load-independent point. In other words, the transmitter or the receiver that has any circuit parameter can operate at the load-independent point. Therefore, the generality of the transmitter and the receiver can be improved.

In the foregoing description, the voltage regulation module is disposed in the transmitter, and the transmitter regulates the voltage gain to the voltage gain at the load-independent point by regulating the input voltage such that the wireless charging system finally operates at the load-independent point. Alternatively, the voltage regulation module may be disposed in the receiver, which is described in detail below.

Figure 13:
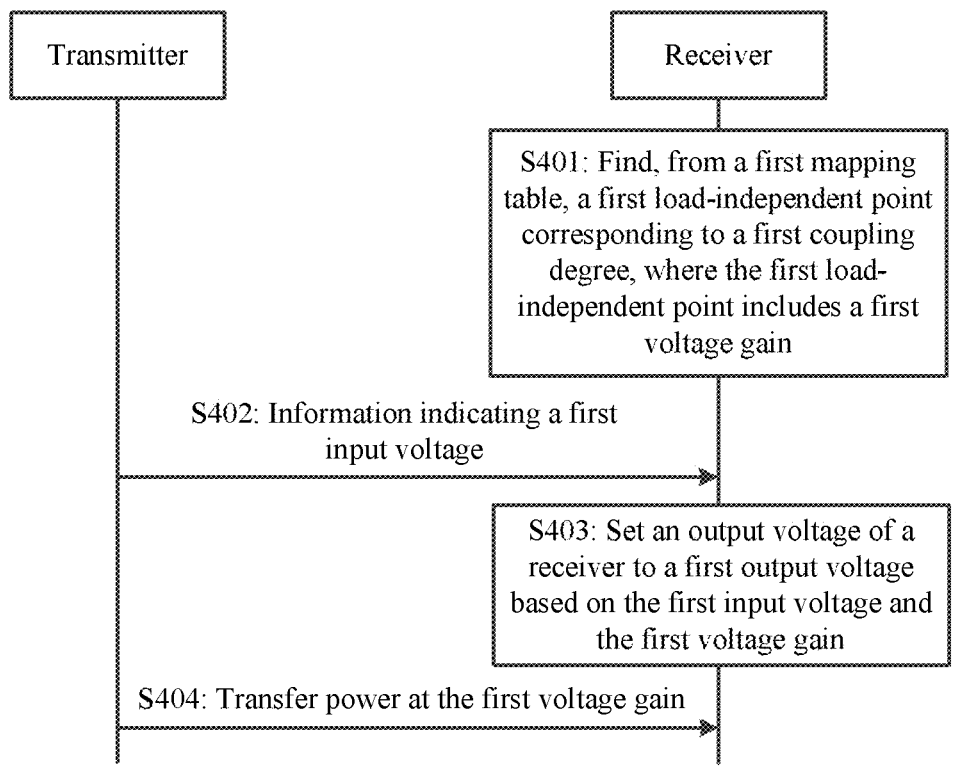
FIG. 13 is a schematic flowchart of yet another wireless charging method according to an embodiment of this application.

(2) Implementation of Wireless Charging when Const≠0 and the Voltage Regulation Module is Disposed in the Transmitter Based on the schematic structural diagram of the wireless charging system described in FIG. 9, FIG. 13 is a schematic flowchart of yet another wireless charging method according to an embodiment of this application. In this embodiment described in FIG. 13, a voltage gain X0 at a load-independent point ($\varpi$0, X0) of the wireless charging system is related to a coupling factor. The wireless charging method may include the following steps.

S401. A receiver finds, from a first mapping table, a first load-independent point corresponding to a first coupling degree, where the first load-independent point includes a first voltage gain.

S402. The receiver receives information sent by a transmitter and indicating a first input voltage.

S403. The receiver sets an output voltage of the receiver to a first output voltage based on the first input voltage and a first voltage gain.

S404. The transmitter transfers power to the receiver at the first voltage gain.

In this embodiment of this application, the receiver may pre-store the first mapping table, the first mapping table may include at least one coupling degree and a load-independent point corresponding to each of the at least one coupling degree, and the load-independent point is a combination of a voltage gain and an operating frequency. At an operating frequency in a load-independent point corresponding to each coupling degree, a voltage gain in the load-independent point corresponding to the coupling degree is independent of an output load of the receiver. The foregoing coupling degree may be a coupling factor or a mutual inductance. The mutual inductance is used as an example below.

For description of the first mapping table, refer to the embodiment described in FIG. 12. Details are not described herein again.

A performing sequence of step S401 and step S402 is not limited. Before step S401, the transmitter may receive information sent by the receiver and indicating the first output voltage, and determine the input voltage of the transmitter as the first input voltage based on the first output voltage. The transmitter may determine the first input voltage based on a pre-stored second mapping table. The second mapping table includes at least one output voltage and an input voltage of the transmitter corresponding to each of the at least one output voltage. When the input voltage of the transmitter is the input voltage of the transmitter corresponding to each output voltage, the wireless charging system is regulated to operate at the load-independent point, and the output voltage of the receiver is each output voltage. In this case, the first output voltage meets the expected output voltage of the BMS in the receiver.

During a charging process of the wireless charging system, if the expected output voltage of the BMS in the receiver varies in different charging phases, the transmitter is also required to include a voltage regulation module. For the voltage regulation module, refer to the voltage regulation module 106 in the transmitter in the embodiment described in FIG. 8. The voltage regulation module is configured to regulate the input voltage of the transmitter to the first input voltage after the transmitter determines the input voltage of the transmitter as the first input voltage based on the first output voltage.

When the wireless charging system performs power transfer at the load-independent point, if the receiver moves, the coupling factor changes, and the voltage gain and the operating frequency at the load-independent point of the wireless charging system also change. The load-independent point needs to be determined again, and the wireless charging system is regulated to operate at the load-independent point, that is, steps S401 to S404 are repeated.

The load-independent point is found from the first mapping table using the coupling degree. The wireless charging system may be set to operate at a load-independent point by setting a voltage gain to a voltage gain at the load-independent point such that the voltage gain is independent of a load impedance of the receiver. Therefore, regardless of a value of an output load impedance of the receiver, both an operating frequency and a voltage gain that are used when the transmitter transfers power to the receiver are fixed values. In other words, the output load impedance of the receiver does not affect a voltage gain between an output voltage of the receiver and an input voltage of the transmitter. Therefore, the output voltage of the receiver is constant, an output voltage jump caused by a load jump can be reduced, an electrical energy loss of a voltage regulator module can be reduced, and charging efficiency of the receiver can be improved. Circuit parameters of the transmitter and the receiver do not need to be limited, and generality of the transmitter and the receiver is improved.

During charging of the wireless charging system, the wireless charging system is set at the load-independent point. At the load-independent point, a change in an output resistance of the receiver does not affect the operating frequency of power transfer, and the change in the output resistance of the receiver does not cause a change in the voltage gain either. Therefore, the output voltage of the receiver is constant, and an output voltage jump caused by an output resistance jump of the receiver is reduced, thereby reducing electrical energy consumed by the voltage regulator module and improving electrical energy conversion efficiency.

Figure 14:
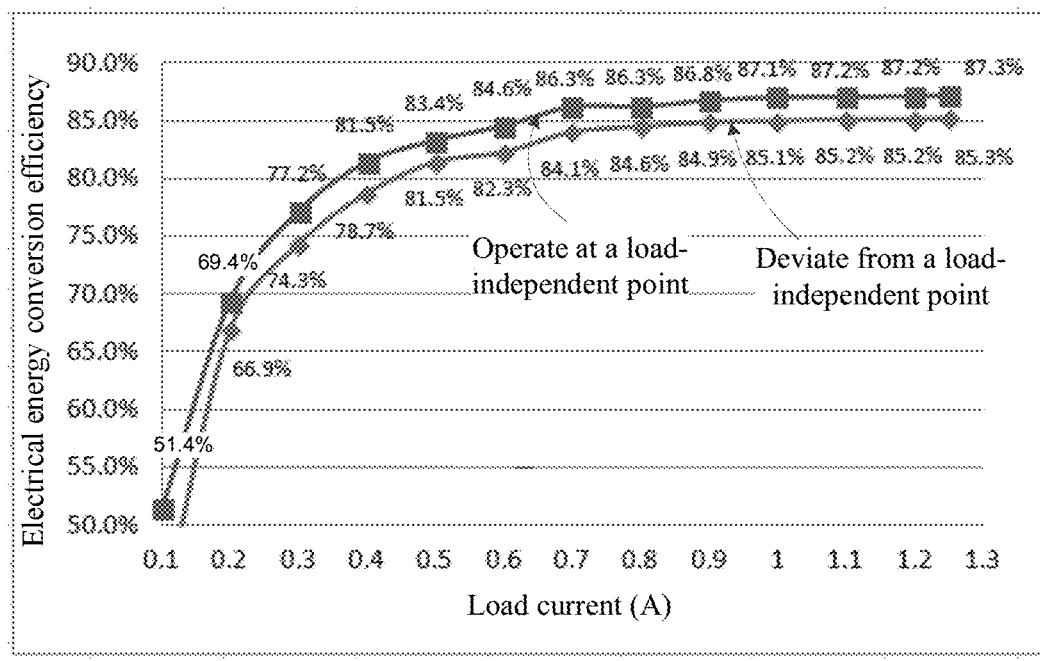
FIG. 14 shows a test result of electrical energy conversion efficiency according to an embodiment of this application.

FIG. 14 shows a test result of electrical energy conversion efficiency according to an embodiment of this application. A test curve of electrical energy conversion efficiency shown in FIG. 14 is a test result produced when a center of a transmitter coil in a transmitter directly faces a center of a receiver coil in a receiver, that is, when a position deviation is 0. The electrical energy conversion efficiency may be understood as a ratio of electrical energy that is output by the transmitter and electrical energy in the receiver that is used to supply power to a load. As shown in FIG. 14, for any load current, electrical energy conversion efficiency generated when a wireless charging system operates at a load-independent point is greater than electrical energy conversion efficiency generated when the wireless charging system deviates from the load-independent point. Therefore, when there is no position deviation between the transmitter and the receiver, the wireless charging system is set to operate at the load-independent point, and the electrical energy conversion efficiency of the wireless charging system can be improved.

Figure 15:
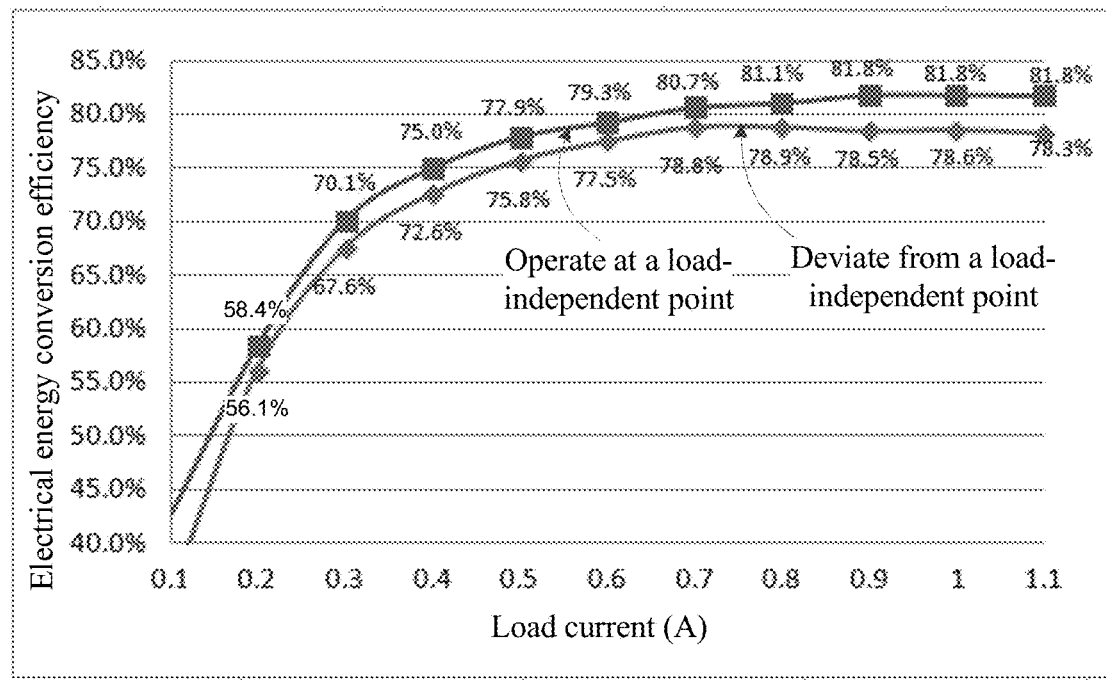
FIG. 15 shows another test result of electrical energy conversion efficiency according to an embodiment of this application.

FIG. 15 shows another test result of electrical energy conversion efficiency according to an embodiment of this application. A test curve of electrical energy conversion efficiency shown in FIG. 15 is a test result produced when a center of a transmitter coil in a transmitter horizontally deviates from a center of a receiver coil in a receiver by 10 mm, that is, when a position deviation is 10 mm. As shown in FIG. 15, for any load current, electrical energy conversion efficiency generated when a wireless charging system operates at a load-independent point is greater than electrical energy conversion efficiency generated when the wireless charging system deviates from the load-independent point. Therefore, when there is a position deviation between the transmitter and the receiver, the wireless charging system is set to operate at the load-independent point, and the electrical energy conversion efficiency of the wireless charging system can be improved.

When the wireless charging system operates at the load-independent point, because the voltage gain does not change with a load change of the receiver, in this case, the wireless charging system is equivalent to a transformer. Therefore, a phase of an output voltage of a DC/AC conversion module in the transmitter is the same as a phase of an input voltage of an AC/DC conversion module in the receiver. In addition, the phase of the input voltage of the AC/DC conversion module in the receiver is also the same as a phase of an input current of the AC/DC conversion module in the receiver. If the AC/DC conversion module in the receiver is implemented using a rectifier diode circuit, when the phase of the input voltage of the AC/DC conversion module is the same as the phase of the input current of the AC/DC conversion module, a diode has a zero current turn-off property. The zero current turn-off property of the diode can reduce electromagnetic interference and improve rectifier efficiency.

Figure 16:
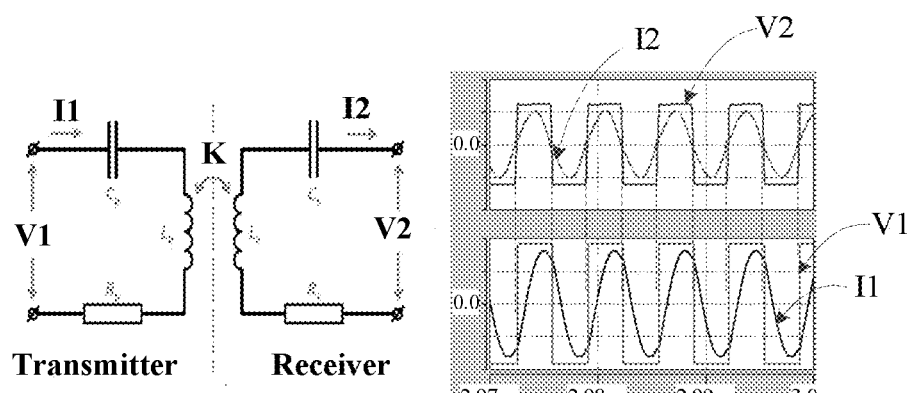
FIG. 16 is a schematic diagram of a test of a voltage and a current according to an embodiment of this application.

FIG. 16 is a schematic diagram of a test of a voltage and a current according to an embodiment of this application. As shown in FIG. 16, an output voltage of a DC/AC conversion module in a transmitter is V1, an output current of the DC/AC conversion module in the transmitter is I1, an input voltage of an AC/DC conversion module in a receiver is V2, and an input current of the AC/DC conversion module in the receiver is I2, where phases of V1 and V2 are the same, and phases of V2 and I2 are the same. The AC/DC conversion module in the receiver uses a diode circuit for rectification, where the diode has a zero current turn-off property. The zero current turn-off property of the diode can reduce electromagnetic interference and improve rectifier efficiency.

The foregoing describes in detail the method in the embodiments of this application, and the following provides the transmitter and the receiver in the embodiments of this application.

Figure 17:
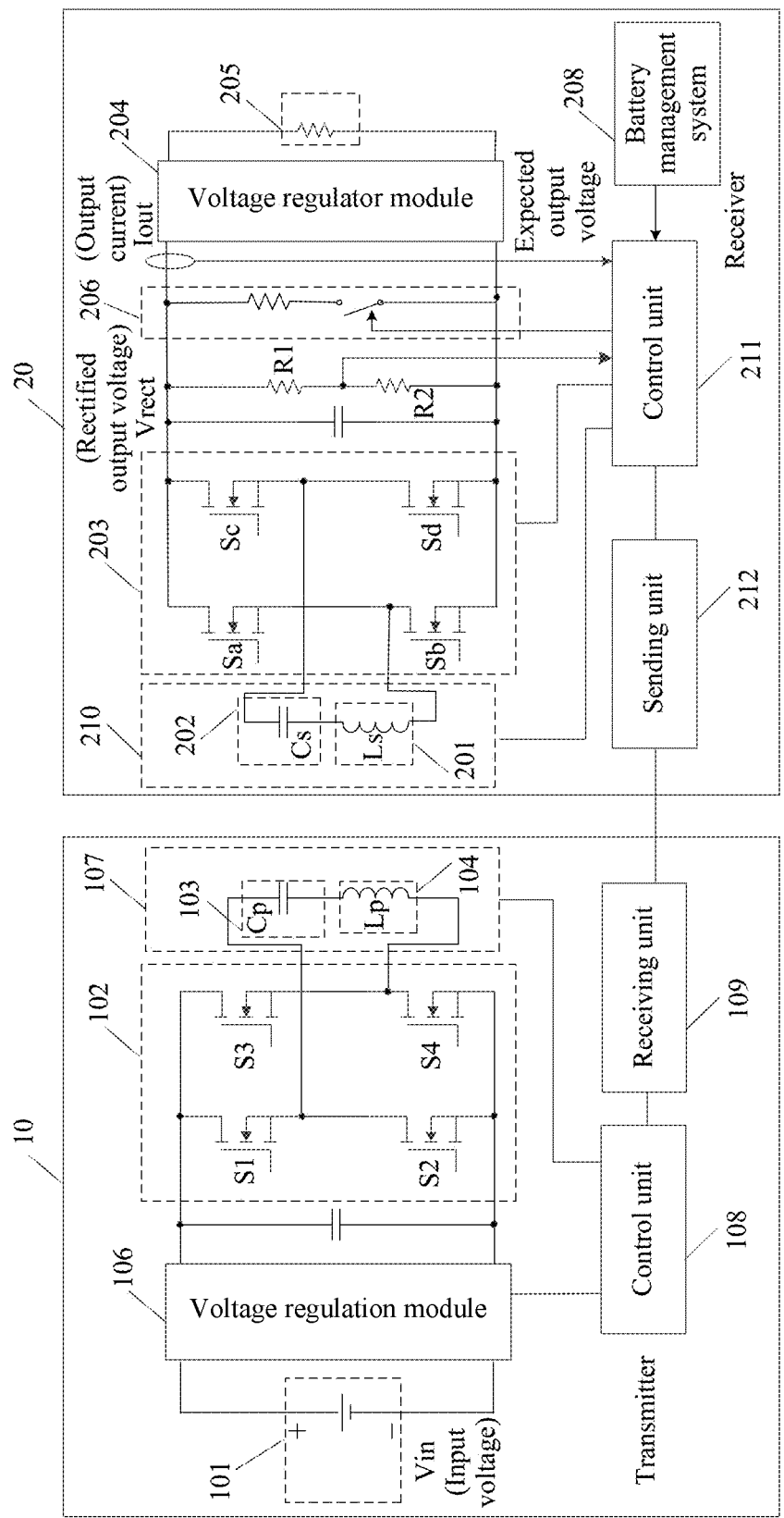
FIG. 17 is a schematic structural diagram of a wireless charging system 100 according to an embodiment of this application.

Based on the system architecture in FIG. 1, FIG. 17 is a schematic structural diagram of a wireless charging system 100 according to an embodiment of this application. The wireless charging system 100 includes a transmitter 10 and a receiver 20.

As shown in FIG. 17, the transmitter 10 includes a transmitter coil 104 and a first series matching capacitor 103, and the transmitter coil 104 is connected to the first series matching capacitor 103 in series to form a first oscillation circuit 107, the first oscillation circuit 107 is configured to transfer power to the receiver 20, and a self-inductance applied when the transmitter coil 104 transfers the power to the receiver 20 is $L_p$, and a capacitance of the first series matching capacitor 103 is $C_p$, where $L_p*C_p=k*L_s*C_s$, is a self-inductance applied when a receiver coil 201 in the receiver 20 receives the power transferred by the first oscillation circuit, $C_s$ is a capacitance of a second series matching capacitor 202 in the receiver 20, and k is a positive number that meets $0.8 \leq k \leq 1.2$, the receiver coil 201 is connected to the second series matching capacitor 202 in series to form a second oscillation circuit, the second oscillation circuit is configured to receive the power transferred by the first oscillation circuit, and the transmitter 10 further includes a control unit 108 configured to set a voltage gain between an output voltage of the receiver 20 and an input voltage of the transmitter 10 to a first voltage gain, where the first voltage gain is X, and X is a positive number that meets $0.8*\sqrt{C_p/C_s} \leq X \leq 1.2*\sqrt{C_p/C_s}$, or X is a positive number that meets $0.8*\sqrt{L_s/L_p} \leq X \leq 1.2*\sqrt{L_s/L_p}$, when the voltage gain between the output voltage of the receiver and the input voltage of the transmitter is the first voltage gain, the wireless charging system operates at a load-independent point, the load-independent point includes a first operating frequency and the first voltage gain, and at the first operating frequency, the first voltage gain is independent of an output load of the receiver, and the control unit 108 is further configured to control the first oscillation circuit 107 to transfer the power to the receiver 20 at the first voltage gain.

As a possible implementation, k is 1, and X is $\sqrt{C_p/C_s}$ or $\sqrt{L_s/L_p}$.

As a possible implementation, the transmitter 10 further includes a receiving unit 109, and that a control unit 108 sets a voltage gain between an output voltage of the receiver 20 and an input voltage of the transmitter 10 to a first voltage gain includes the receiving unit 109 is configured to receive information sent by the receiver 20 and indicating a first output voltage, where the first output voltage is an expected output voltage of the receiver, and the control unit 108 is further configured to set the input voltage of the transmitter 10 to a first input voltage based on the first output voltage and the first voltage gain.

As a possible implementation, the transmitter 10 may include a voltage regulation module 106. That the control unit 108 sets the input voltage of the transmitter 10 to a first input voltage based on the first output voltage and the first voltage gain includes the control unit 108 controls, based on the first output voltage and the first voltage gain, the voltage regulation module 106 to set the input voltage of the transmitter 10 to the first input voltage.

As a possible implementation, before the control unit 108 sets the voltage gain between the output voltage of the receiver 20 and the input voltage of the transmitter 10 to the first voltage gain, the receiving unit 109 is further configured to receive information sent by the receiver 20 and indicating $C_s$ and/or information sent by the receiver 20 and indicating $L_s$, where $C_s$ and $L_s$ are used by the transmitter 10 to determine the first voltage gain, and/or the receiving unit 109 is configured to receive information sent by the receiver 20 and indicating the first voltage gain.

As shown in FIG. 17, the receiver 20 includes the receiver coil 201 and the second series matching capacitor 202, the receiver coil 201 is connected to the second series matching capacitor 202 in series to form a second oscillation circuit 210, and the second oscillation circuit 210 is configured to receive power transferred by the transmitter 10, a self-inductance applied when the receiver coil 201 receives the power transferred by the transmitter 10 is $L_s$, and a capacitance of the second series matching capacitor 202 is $C_s$, where $$L_s * C_s = \frac{L_p * C_p}{k},$$

$L_p$ is a self-inductance applied when the transmitter coil 104 in the transmitter 10 transfers the power to the receiver 20, $C_p$ is a capacitance of the first series matching capacitor 103 in the transmitter 10, and k is a positive number that meets $0.8 \le k \le 1.2$, the transmitter coil 104 is connected to the first series matching capacitor 103 in series to form the first oscillation circuit 107, and the first oscillation circuit 107 is configured to transfer the power to the second oscillation circuit 210.

The receiver 20 further includes a sending unit 212 and a control unit 211, where the sending unit 212 is configured to send, to the transmitter 10, the information that indicates the first output voltage, where the first output voltage is the expected output voltage of the receiver 20, and the first output voltage is used by the transmitter 10 to set the input voltage of the transmitter 10 to the first input voltage based on the first output voltage and the first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when the voltage gain between the output voltage of the receiver 20 and the input voltage of the transmitter 10 is the first voltage gain, the wireless charging system 100 operates at a load-independent point, the load-independent point includes a first operating frequency and the first voltage gain, and at the first operating frequency, the first voltage gain is independent of an output load of the receiver 20, and the control unit 211 is configured to control the second oscillation circuit 210 to receive the power transferred by the transmitter 10 at the first voltage gain.

In this embodiment of this application, the transmitter 10 may further include a DC power source 101 and a DC/AC conversion module 102. The receiver 20 may include an AC/DC conversion module 203, a voltage regulator module 204, a output load 205, a modulation module 206, and a BMS 208. For detailed descriptions of the foregoing modules, refer to the architectures of the wireless charging systems described in FIG. 1 and FIG. 8. Details are not described herein again.

In this embodiment of this application, the control unit 108 may be implemented by the control module 105 in the embodiment described in FIG. 8. The control unit 211 may be implemented by the control module 207 in the embodiment described in FIG. 8. The control unit 108 may further have another function of the control module 105. For details, refer to the embodiment described in FIG. 8. The control unit 211 may further have another function of the control module 207. For details, refer to the embodiment described in FIG. 8. Functions of the control unit 108, the receiving unit 109, the control unit 211, and the sending unit 212 may correspond to the corresponding descriptions of the wireless charging method embodiment shown in FIG. 9. Details are not described herein again.

Based on the wireless charging system 100 described in FIG. 17, in another possible embodiment, the control unit 108 is configured to find, from a first mapping table, a first load-independent point corresponding to a first coupling degree, or the receiving unit is configured to receive information sent by the receiver and indicating a first load-independent point, where the first load-independent point is a first load-independent point corresponding to a first coupling degree and found by the receiver from a first mapping table, where the first load-independent point includes a first voltage gain, and the first coupling degree is a degree of coupling between the coil in the transmitter and the coil in the receiver, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, the control unit 108 is configured to set a voltage gain between an output voltage of the receiver 20 and an input voltage of the transmitter 10 to the first voltage gain, and the control unit 108 is further configured to control the first oscillation circuit 107 to transfer the power to the receiver at the first voltage gain.

As a possible implementation, that a control unit 108 sets a voltage gain between an output voltage of the receiver 20 and an input voltage of the transmitter 10 to a first voltage gain includes the receiving unit 109 is configured to receive information sent by the receiver 20 and indicating a first output voltage, where the first output voltage is an expected output voltage of the receiver, and the transmitter 10 sets the input voltage of the transmitter to a first input voltage based on the first output voltage and the first voltage gain.

As a possible implementation, before the control unit 108 sets the voltage gain between the output voltage of the receiver 20 and the input voltage of the transmitter 10 to the first voltage gain, the receiving unit 109 is further configured to receive information sent by the receiver 20 and indicating $C_s$ and/or information sent by the receiver 20 and indicating $L_s$, where $C_s$ and $L_s$ are used by the transmitter 10 to determine the first voltage gain, and/or the transmitter 10 is configured to receive information sent by the receiver 20 and indicating the first voltage gain.

In the receiver 20, the sending unit 212 is configured to send, to the transmitter 10, information that indicates a first output voltage, where the first output voltage is an expected output voltage of the receiver 20, and the first output voltage is used by the transmitter 10 to set an input voltage of the transmitter 10 to a first input voltage based on the first output voltage and the first voltage gain. The first voltage gain is included in a first load-independent point corresponding to a first coupling degree and found by the transmitter 10 from a first mapping table, or the first voltage gain is included in a first load-independent point corresponding to a first coupling degree and found by the receiver 20 from a first mapping table, and the first load-independent point is added to information indicating the first load-independent point, and then sent by the receiver 20 to the transmitter 10.

The first coupling degree is a degree of coupling between the transmitter coil 104 in the transmitter 10 and the receiver coil 201 in the receiver 20, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver.

The control unit 211 is configured to control the second oscillation circuit to receive the power transferred by the transmitter 10 at the first voltage gain.

In this embodiment of this application, the control unit 108 may be implemented by the control module 105 in the embodiment described in FIG. 8. The control unit 211 may be implemented by the control module 207 in the embodiment described in FIG. 8. Alternatively, the control unit 108 may be a controller 30 in the embodiment described in FIG. 19. Alternatively, the control unit 211 may be a controller 40 in the embodiment described in FIG. 19. The control unit 108 may further have another function of the control module 105. For details, refer to the embodiment described in FIG. 8. The control unit 211 may further have another function of the control module 207. For details, refer to the embodiment described in FIG. 8. Functions of the control unit 108, the receiving unit 109, the control unit 211, and the sending unit 212 may correspond to the corresponding descriptions of the wireless charging method embodiment shown in FIG. 12. Details are not described herein again.

Figure 18:
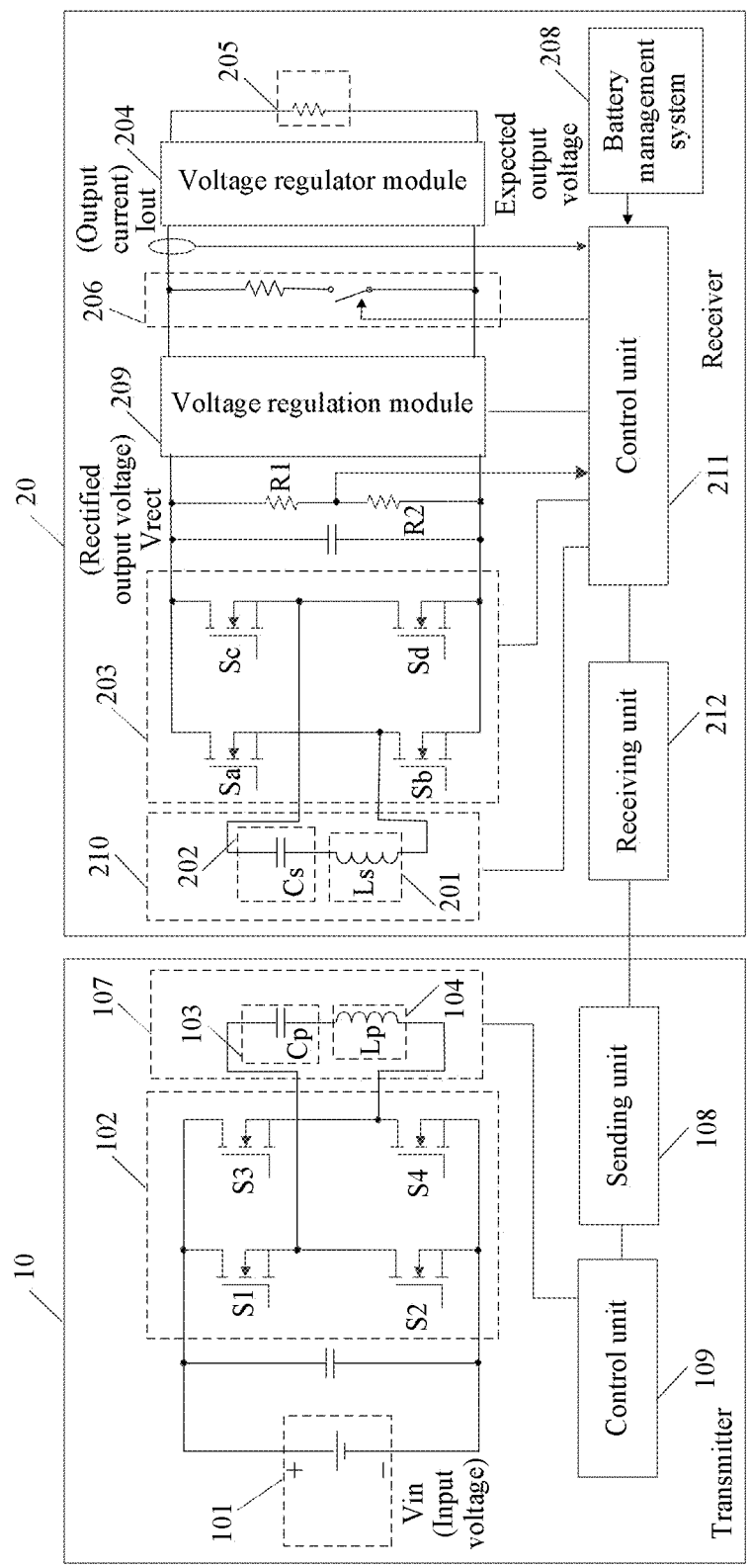
FIG. 18 is a schematic structural diagram of another wireless charging system 100 according to an embodiment of this application.

Based on the system architecture in FIG. 1, FIG. 18 is a schematic structural diagram of another wireless charging system 100 according to an embodiment of this application. The wireless charging system 100 includes a transmitter 10 and a receiver 20.

As shown in FIG. 18, the transmitter 10 includes a transmitter coil 104 and a first series matching capacitor 103, and the transmitter coil 104 is connected to the first series matching capacitor 103 in series to form a first oscillation circuit 107, the first oscillation circuit 107 is configured to transfer power to the receiver 20, and a self-inductance applied when the transmitter coil 104 transfers the power to the receiver 20 is $L_p$, and a capacitance of the first series matching capacitor 103 is $C_p$, where $L_p*C_p=k*L_s*C_s$, $L_s$ is a self-inductance applied when a receiver coil 201 in the receiver 20 receives the power transferred by the first oscillation circuit, $C_s$ is a capacitance of a second series matching capacitor 202 in the receiver 20, and k is a positive number that meets $0.8 \leq k \leq 1.2$, the receiver coil 201 is connected to the second series matching capacitor 202 in series to form a second oscillation circuit, the second oscillation circuit is configured to receive the power transferred by the first oscillation circuit, and the transmitter 10 further includes a sending unit 108 configured to send, to the receiver 20, information that indicates a first input voltage, where the first input voltage is an input voltage of the transmitter 10, and the first input voltage is used by the receiver to set an output voltage of the receiver to a first output voltage based on the first input voltage and a first voltage gain, where the first voltage gain is X, and X is a positive number that meets $0.8*\sqrt{C_p/C_s} \leq X \leq 1.2*\sqrt{C_p/C_s}$, or X is a positive number that meets $0.8*\sqrt{L_s/L_p} \leq X \leq 1.2*\sqrt{L_s/L_p}$, when the voltage gain between the output voltage of the receiver 20 and the input voltage of the transmitter 10 is the first voltage gain, the wireless charging system 100 operates at a load-independent point, the load-independent point includes a first operating frequency and the first voltage gain, and at the first operating frequency, the first voltage gain is independent of an output load of the receiver 20, and a control unit 109 is configured to control the first oscillation circuit 107 to transfer the power to the receiver 20 at the first voltage gain.

As shown in FIG. 18, the receiver 20 includes the receiver coil 201 and the second series matching capacitor 202, the receiver coil 201 is connected to the second series matching capacitor 202 in series to form a second oscillation circuit 210, and the second oscillation circuit 210 is configured to receive power transferred by the transmitter 10, a self-inductance applied when the receiver coil 201 receives the power transferred by the transmitter 10 is $L_s$, and a capacitance of the second series matching capacitor 202 is $C_s$, where $$L_s * C_s = \frac{L_p * C_p}{k},$$

$L_p$ is a self-inductance applied when the transmitter coil 104 in the transmitter 10 transfers the power to the receiver 20, $C_p$ is a capacitance of the first series matching capacitor 103 in the transmitter 10, and k is a positive number that meets $0.8 \leq k \leq 1.2$, the transmitter coil 104 is connected to the first series matching capacitor 103 in series to form the first oscillation circuit 107, and the first oscillation circuit 107 is configured to transfer the power to the second oscillation circuit 210.

The receiver 20 further includes a control unit 211, where the control unit 211 is configured to set a voltage gain between an output voltage of the receiver 20 and an input voltage of the transmitter 10 to a first voltage gain, where the first voltage gain is X, and X is a positive number that meets $0.8*\sqrt{C_p/C_s} \le X \le 1.2*\sqrt{C_p/C_s}$, or X is a positive number that meets $0.8*\sqrt{L_s/L_p} \le X \le 1.2*\sqrt{L_s/L_p}$, when the voltage gain between the output voltage of the receiver 20 and the input voltage of the transmitter 10 is the first voltage gain, the wireless charging system 100 operates at a load-independent point, the load-independent point includes a first operating frequency and the first voltage gain, and at the first operating frequency, the first voltage gain is independent of an output load of the receiver 20, and the control unit 211 is further configured to control the second oscillation circuit 210 to receive the power transferred by the transmitter 10 at the first voltage gain.

As a possible implementation, k is 1, and X is $\sqrt{C_p/C_s}$ or $\sqrt{L_s/L_p}$.

As a possible implementation, the receiver 20 further includes a receiving unit 212, and that the control unit 211 sets a voltage gain between an output voltage of the receiver 20 and an input voltage of the transmitter 10 to a first voltage gain includes the receiving unit 212 is configured to receive information sent by the transmitter 10 and indicating a first input voltage, where the first input voltage is the input voltage of the transmitter 10, and the control unit 211 is further configured to set the output voltage of the receiver 20 to a first output voltage based on the first input voltage and the first voltage gain.

As a possible implementation, the receiver 20 may include a voltage regulation module 209. That the control unit 211 sets the output voltage of the receiver 20 to a first output voltage based on the first input voltage and the first voltage gain includes the control unit 211 controls, based on the first input voltage and the first voltage gain, the voltage regulation module 209 to set the output voltage of the receiver 10 to the first output voltage.

As a possible implementation, before the control unit 211 sets the voltage gain between the output voltage of the receiver 20 and the input voltage of the transmitter 10 to the first voltage gain, the receiving unit 212 is further configured to receive information sent by the transmitter 10 and indicating $C_p$ and/or information sent by the transmitter 10 and indicating $L_p$, where $C_p$ and $L_p$ are used by the receiver 20 to determine the first voltage gain, and/or the receiving unit 212 is further configured to receive information sent by the transmitter 10 and indicating the first voltage gain.

In this embodiment of this application, the transmitter 10 may further include a DC power source 101 and a DC/AC conversion module 102. The receiver 20 may further include an AC/DC conversion module 203, a voltage regulator module 204, a output load 205, a modulation module 206, and a BMS 208. For detailed descriptions of the foregoing modules, refer to the architectures of the wireless charging systems described in FIG. 1 and FIG. 8. Details are not described herein again.

In this embodiment of this application, the control unit 109 may be implemented by the control module 105 in the embodiment described in FIG. 10. The control unit 211 may be implemented by the control module 207 in the embodiment described in FIG. 10. The control unit 109 may be a controller 30 in the embodiment described in FIG. 19. The control unit 211 may be a controller 40 in the embodiment described in FIG. 19. The control unit 109 may further have another function of the control module 105. For details, refer to the embodiment described in FIG. 10. The control unit 211 may further have another function of the control module 207. For details, refer to the embodiment described in FIG. 10. Functions of the control unit 109, the sending unit 108, the control unit 211, and the receiving unit 212 may correspond to the corresponding descriptions of the wireless charging method embodiment shown in FIG. 11. Details are not described herein again.

Based on the wireless charging system 100 described in FIG. 18, in another possible embodiment, the sending unit 108 is configured to send, to the receiver 20, information that indicates a first input voltage, where the first input voltage is an input voltage of the transmitter 10, and the first input voltage is used by the receiver 20 to set an output voltage of the receiver 20 to a first output voltage based on the first input voltage and the first voltage gain. The first voltage gain is included in a first load-independent point corresponding to a first coupling degree and found by the transmitter 10 from a first mapping table, or the first voltage gain is included in a first load-independent point corresponding to a first coupling degree and found by the receiver 20 from a first mapping table, and the first load-independent point is added to information indicating the first load-independent point, and then sent by the receiver to the transmitter 10.

The first coupling degree is a degree of coupling between the transmitter coil 104 in the transmitter 10 and the receiver coil 201 in the receiver 20, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, and the control unit 109 is further configured to control the first oscillation circuit 107 to transfer the power to the receiver 20 at the first voltage gain.

In the receiver 20, the control unit 211 is configured to find, from a first mapping table, a first load-independent point corresponding to a first coupling degree, or the receiving unit 212 is configured to receive information sent by the transmitter 10 and indicating a first load-independent point, where the first load-independent point is a first load-independent point corresponding to a first coupling degree and found by the transmitter 10 from a first mapping table, where the first load-independent point includes a first voltage gain, and the first coupling degree is a degree of coupling between the transmitter coil 104 in the transmitter 10 and the receiver coil 201 in the receiver 20, the first mapping table includes at least one coupling degree and a load-independent point corresponding to each of the at least one coupling degree, and the load-independent point is a combination of a voltage gain and an operating frequency, and at an operating frequency in a load-independent point corresponding to each coupling degree, a voltage gain in the load-independent point corresponding to the coupling degree is independent of an output load of the receiver, the control unit 211 is further configured to set a voltage gain between an output voltage of the receiver 20 and an input voltage of the transmitter 10 to the first voltage gain, and the control unit 211 is further configured to control the second oscillation circuit 210 to receive the power transferred by the transmitter 10 at the first voltage gain.

As a possible implementation, that the control unit 211 sets a voltage gain between an output voltage of the receiver 20 and an input voltage of the transmitter 10 to a first voltage gain includes the receiving unit 212 is further configured to receive information sent by the transmitter 10 and indicating a first input voltage, where the first input voltage is the input voltage of the transmitter 10, and the control unit 211 is further configured to set the output voltage of the receiver to a first output voltage based on the first input voltage and the first voltage gain.

As a possible implementation, before the control unit 211 sets the voltage gain between the output voltage of the receiver 20 and the input voltage of the transmitter 10 to the first voltage gain, the receiving unit 212 is further configured to receive information sent by the transmitter 10 and indicating $C_p$ and/or information sent by the transmitter 10 and indicating $L_p$, where $C_p$ and $L_p$ are used by the receiver 20 to determine the first voltage gain, and/or receiving, by the receiver 20, information sent by the transmitter 10 and indicating the first voltage gain.

In this embodiment of this application, the control unit 109 may be implemented by the control module 105 in the embodiment described in FIG. 10. The control unit 211 may be implemented by the control module 207 in the embodiment described in FIG. 10. The control unit 108 may further have another function of the control module 105. For details, refer to the embodiment described in FIG. 10. The control unit 211 may further have another function of the control module 207. For details, refer to the embodiment described in FIG. 10. Functions of the control unit 108, the receiving unit 109, the control unit 211, and the sending unit 212 may correspond to the corresponding descriptions of the wireless charging method embodiment shown in FIG. 13. Details are not described herein again.

Figure 19:
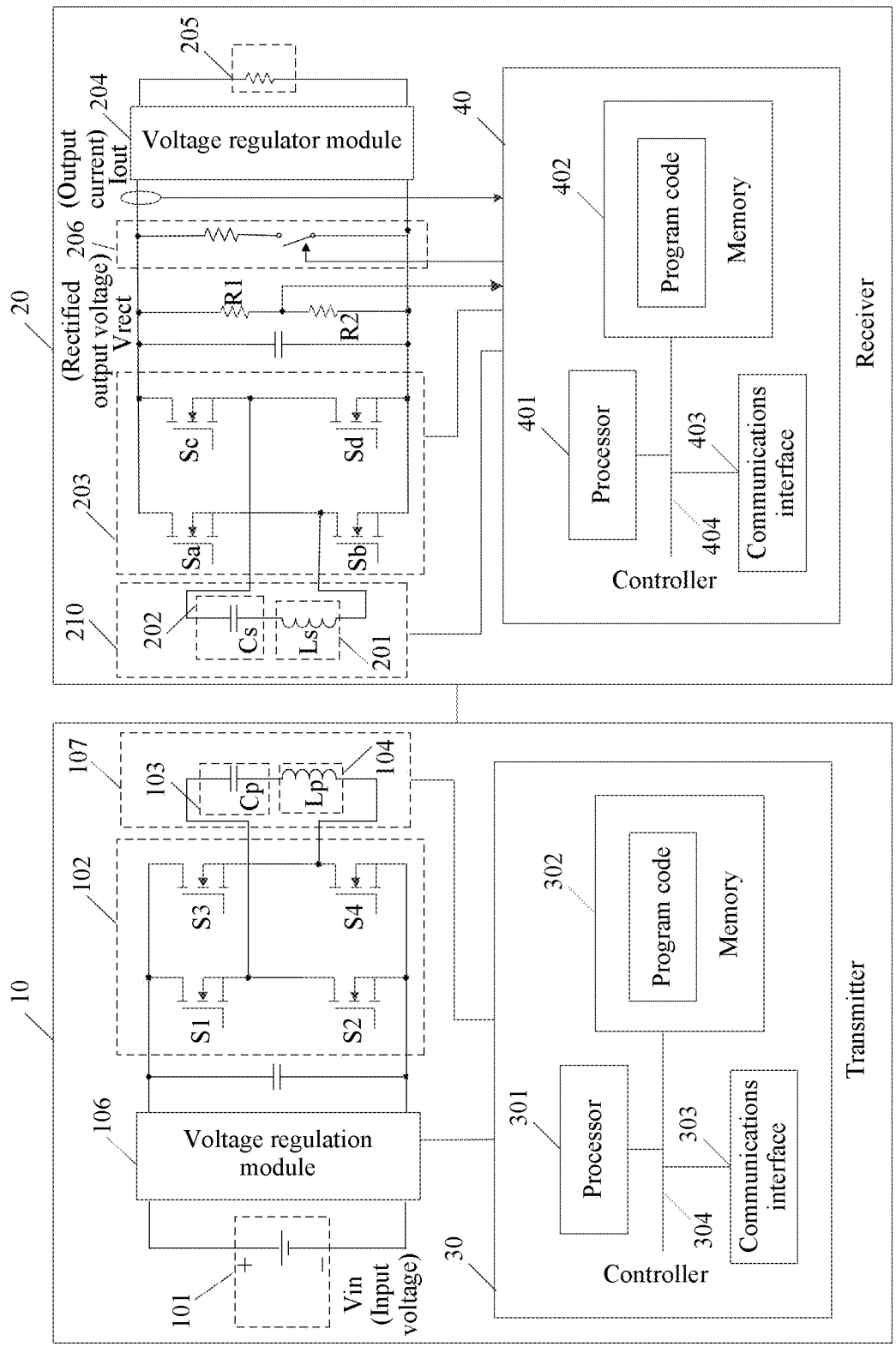
FIG. 19 is a schematic structural diagram of still another wireless charging system 100 according to an embodiment of this application.

Based on the system architecture in FIG. 1, FIG. 19 is a schematic structural diagram of still another wireless charging system 100 according to an embodiment of this application. The wireless charging system 100 includes a transmitter 10 and a receiver 20.

As shown in FIG. 19, the transmitter 10 includes a transmitter coil 104 and a first series matching capacitor 103, and the transmitter coil 104 is connected to the first series matching capacitor 103 in series to form a first oscillation circuit 107, the first oscillation circuit 107 is configured to transfer power to the receiver 20, and a self-inductance applied when the transmitter coil 104 transfers the power to the receiver 20 is $L_p$, and a capacitance of the first series matching capacitor 103 is $C_p$, where $L_p*C_p=k*L_s*C_s$, $L_s$ is a self-inductance applied when a receiver coil 201 in the receiver 20 receives the power transferred by the first oscillation circuit, $C_s$ is a capacitance of a second series matching capacitor 202 in the receiver 20, and k is a positive number that meets 0.8≤k≤1.2, the receiver coil 201 is connected to a second series matching capacitor 202 in series to form a second oscillation circuit, the second oscillation circuit is configured to receive the power transferred by the first oscillation circuit, and the transmitter 10 further includes a voltage regulation module 106 configured to regulate an input voltage of the transmitter 10. The transmitter 10 further includes a controller 30, where the controller 30 includes one or more processors 301, a memory 302, and a communications interface 303. These components may be connected using a bus 304 or in another manner. A bus connection is used as an example in FIG. 19.

The communications interface 303 may be configured for communication between the transmitter 10 and another communications device, for example, the receiver 20. Specifically, the transmitter 10 and the receiver 20 may be the transmitter 10 and the receiver 20 shown in FIG. 8 or FIG. 17. Specifically, the communications interface 303 may be an in-band communications interface in the wireless charging system. For detailed descriptions of in-band communication, refer to the embodiment described in FIG. 1.

Alternatively, the communications interface 303 may be an out-band interface, for example, a BLUETOOTH communications interface, a ZIGBEE communications interface, or a WI-FI communications interface, or may be extended to another communications interface. This is not limited in this embodiment of this application.

The memory 302 is coupled to the processor 301, and is configured to store various software programs and/or a plurality of sets of instructions. The memory 302 may further store a data transmission program. The data transmission program may be used for communication with one or more additional devices, one or more transmitters, or one or more receivers.

In some embodiments of this application, the memory 302 may be configured to store a program for implementing, on a side of the transmitter 10, the wireless charging method provided in one or more embodiments of this application. For implementation of the wireless charging method provided in one or more embodiments of this application, refer to the embodiments described in FIG. 9 and FIG. 12.

The processor 301 may be configured to read and execute a computer readable instruction. Specifically, the processor 301 may be configured to invoke the program stored in the memory 302, for example, the program for implementing, on the side of the transmitter 10, the wireless charging method provided in one or more embodiments of this application, and execute the instruction included in the program.

It should be noted that the transmitter 10 shown in FIG. 19 is merely one implementation in the embodiments of this application. During actual application, the transmitter 10 may further include more or fewer components, and this is not limited herein.

As shown in FIG. 19, the receiver 20 includes the receiver coil 201 and the second series matching capacitor 202, the receiver coil 201 is connected to the second series matching capacitor 202 in series to form a second oscillation circuit 210, and the second oscillation circuit 210 is configured to receive power transferred by the transmitter 10, a self-inductance applied when the receiver coil 201 receives the power transferred by the transmitter 10 is $L_s$, and a capacitance of the second series matching capacitor 202 is $C_s$, where $$L_s*C_s = \frac{L_p*C_p}{k},$$

$L_p$ is a self-inductance applied when the transmitter coil 104 in the transmitter 10 transfers the power to the receiver 20, $C_p$ is a capacitance of the first series matching capacitor 103 in the transmitter 10, and k is a positive number that meets 0.8≤k≤1.2, the transmitter coil 104 is connected to the first series matching capacitor 103 in series to form the first oscillation circuit 107, and the first oscillation circuit 107 is configured to transfer the power to the second oscillation circuit 210.

The receiver 20 further includes a controller 40, where the controller 40 includes one or more processors 401, a memory 402, and a communications interface 403. These components may be connected using a bus 404 or in another manner. A bus connection is used as an example in FIG. 19.

The communications interface 403 may be configured for communication between the receiver 20 and another communications device, for example, the transmitter 10. Specifically, the transmitter 10 and the receiver 20 may be the transmitter 10 and the receiver 20 shown in FIG. 8 or FIG. 17. Specifically, the communications interface 403 may be an in-band communications interface in the wireless charging system. For detailed descriptions of in-band communication, refer to the embodiment described in FIG. 1.

Alternatively, the communications interface 403 may be an out-band interface, for example, a BLUETOOTH communications interface, a ZIGBEE communications interface, or a WI-FI communications interface, or may be extended to another communications interface. This is not limited in this embodiment of this application.

The memory 402 is coupled to the processor 401, and is configured to store various software programs and/or a plurality of sets of instructions. The memory 402 may further store a data transmission program. The data transmission program may be used for communication with one or more additional devices, one or more transmitters, or one or more receivers. In some embodiments of this application, the memory 402 may be configured to store a program for implementing, on a side of the receiver 20, the wireless charging method provided in one or more embodiments of this application. For implementation of the wireless charging method provided in one or more embodiments of this application, refer to the embodiments described in FIG. 9 and FIG. 12.

The processor 401 may be configured to read and execute a computer readable instruction. Specifically, the processor 401 may be configured to invoke the program stored in the memory 402, for example, the program for implementing, on the side of the receiver 20, the wireless charging method provided in one or more embodiments of this application, and execute the instruction included in the program.

It should be noted that the receiver 20 shown in FIG. 19 is merely one implementation in the embodiments of this application. During actual application, the receiver 20 may further include more or fewer components, and this is not limited herein.

The receiver 20 may be a mobile phone, a tablet computer, a computer having a wireless transceiver function, a VR terminal device, or an AR terminal device. Alternatively, the receiver 20 may be a wireless charging electric vehicle, or white goods, for example, a no-tail television, a wireless charging soymilk maker, a wireless charging vacuum cleaning robot, or a multi-rotor drone.

Figure 20:
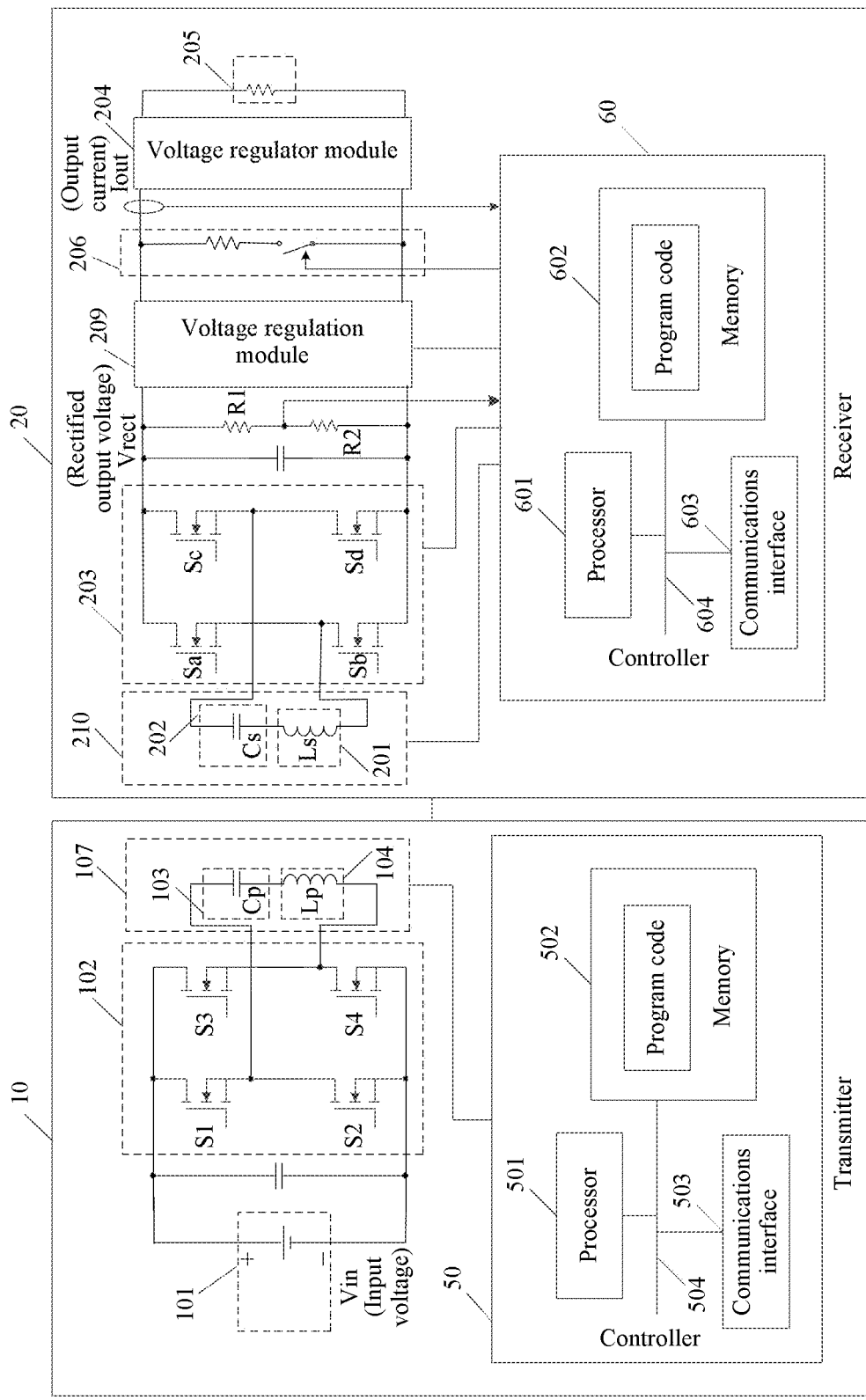
FIG. 20 is a schematic structural diagram of yet another wireless charging system 100 according to an embodiment of this application.

Based on the system architecture in FIG. 1, FIG. 20 is a schematic structural diagram of yet another wireless charging system 100 according to an embodiment of this application. The wireless charging system 100 includes a transmitter 10 and a receiver 20.

As shown in FIG. 20, the transmitter 10 includes a transmitter coil 104 and a first series matching capacitor 103, and the transmitter coil 104 is connected to the first series matching capacitor 103 in series to form a first oscillation circuit 107, the first oscillation circuit 107 is configured to transfer power to the receiver 20, and a self-inductance applied when the transmitter coil 104 transfers the power to the receiver 20 is $L_p$, and a capacitance of the first series matching capacitor 103 is $C_p$, where $L_p*C_p=k*L_s*C_s$, $L_s$ is a self-inductance applied when a receiver coil 201 in the receiver 20 receives the power transferred by the first oscillation circuit, $C_s$ is a capacitance of a second series matching capacitor 202 in the receiver 20, and k is a positive number that meets $0.8 \le k \le 1.2$, the receiver coil 201 is connected to the second series matching capacitor 202 in series to form a second oscillation circuit, the second oscillation circuit is configured to receive the power transferred by the first oscillation circuit, and the transmitter 10 further includes a controller 50, where the controller 50 includes one or more processors 501, a memory 502, and a communications interface 503. These components may be connected using a bus 504 or in another manner. A bus connection is used as an example in FIG. 20.

The communications interface 503 may be configured for communication between the transmitter 10 and another communications device, for example, the receiver 20. Specifically, the transmitter 10 and the receiver 20 may be the transmitter 10 and the receiver 20 shown in FIG. 10 or FIG. 18. Specifically, the communications interface 503 may be an in-band communications interface in the wireless charging system. For detailed descriptions of in-band communication, refer to the embodiment described in FIG. 1.

Alternatively, the communications interface 503 may be an out-band interface, for example, a BLUETOOTH communications interface, a ZIGBEE communications interface, or a WI-FI communications interface, or may be extended to another communications interface. This is not limited in this embodiment of this application.

The memory 502 is coupled to the processor 501, and is configured to store various software programs and/or a plurality of sets of instructions. The memory 502 may further store a data transmission program. The data transmission program may be used for communication with one or more additional devices, one or more transmitters, or one or more receivers.

In some embodiments of this application, the memory 502 may be configured to store a program for implementing, on a side of the transmitter 10, the wireless charging method provided in one or more embodiments of this application. For implementation of the wireless charging method provided in one or more embodiments of this application, refer to the embodiments described in FIG. 11 and FIG. 13.

The processor 501 may be configured to read and execute a computer readable instruction. Specifically, the processor 501 may be configured to invoke the program stored in the memory 502, for example, the program for implementing, on the side of the transmitter 10, the wireless charging method provided in one or more embodiments of this application, and execute the instruction included in the program.

It should be noted that the transmitter 10 shown in FIG. 20 is merely one implementation in the embodiments of this application. During actual application, the transmitter 10 may further include more or fewer components, and this is not limited herein.

In this embodiment of this application, the transmitter 10 may further include a DC power source 101 and a DC/AC conversion module 102. The receiver 20 may include an AC/DC conversion module 203, a voltage regulator module 204, a output load 205, a modulation module 206, and a BMS 208. For detailed descriptions of the foregoing modules, refer to the architectures of the wireless charging systems described in FIG. 1 and FIG. 8. Details are not described herein again.

As shown in FIG. 20, the receiver 20 includes the receiver coil 201 and the second series matching capacitor 202, the receiver coil 201 is connected to the second series matching capacitor 202 in series to form a second oscillation circuit 210, and the second oscillation circuit 210 is configured to receive power transferred by the transmitter 10, a self-inductance applied when the receiver coil 201 receives the power transferred by the transmitter 10 is $L_s$, and a capacitance of the second series matching capacitor 202 is $C_s$, where $$L_s * C_s = \frac{L_p * C_p}{k},$$

$L_p$ is a self-inductance applied when the transmitter coil 104 in the transmitter 10 transfers the power to the receiver 20, $C_p$ is a capacitance of the first series matching capacitor 103 in the transmitter 10, and k is a positive number that meets 0.8≤k≤1.2, the transmitter coil 104 is connected to the first series matching capacitor 103 in series to form the first oscillation circuit 107, the first oscillation circuit 107 is configured to transfer the power to the second oscillation circuit 210, and the receiver 20 further includes a voltage regulation module 209 configured to regulate an output voltage of the receiver 20.

The receiver 20 further includes a controller 60, where the controller 60 includes one or more processors 601, a memory 602, and a communications interface 603. These components may be connected using a bus 604 or in another manner. A bus connection is used as an example in FIG. 20.

The communications interface 603 may be configured for communication between the receiver 20 and another communications device, for example, the transmitter 10. Specifically, the transmitter 10 and the receiver 20 may be the transmitter 10 and the receiver 20 shown in FIG. 10 or FIG. 18. Specifically, the communications interface 603 may be an in-band communications interface in the wireless charging system. For detailed descriptions of in-band communication, refer to the embodiment described in FIG. 1.

Alternatively, the communications interface 603 may be an out-band interface, for example, a BLUETOOTH communications interface, a ZIGBEE communications interface, or a WI-FI communications interface, or may be extended to another communications interface. This is not limited in this embodiment of this application.

The memory 602 is coupled to the processor 601, and is configured to store various software programs and/or a plurality of sets of instructions. The memory 602 may further store a data transmission program. The data transmission program may be used for communication with one or more additional devices, one or more transmitters, or one or more receivers.

In some embodiments of this application, the memory 602 may be configured to store a program for implementing, on a side of the receiver 20, the wireless charging method provided in one or more embodiments of this application. For implementation of the wireless charging method provided in one or more embodiments of this application, refer to the embodiments described in FIG. 11 and FIG. 13.

The processor 601 may be configured to read and execute a computer readable instruction. Specifically, the processor 601 may be configured to invoke the program stored in the memory 602, for example, the program for implementing, on the side of the receiver 20, the wireless charging method provided in one or more embodiments of this application, and execute the instruction included in the program.

It should be noted that the receiver 20 shown in FIG. 20 is merely one implementation in the embodiments of this application. During actual application, the receiver 20 may further include more or fewer components, and this is not limited herein.

In this embodiment of this application, the transmitter 10 may further include a DC power source 101 and a DC/AC conversion module 102. The receiver 20 may include an AC/DC conversion module 203, a voltage regulator module 204, a output load 205, a modulation module 206, and a BMS 208. For detailed descriptions of the foregoing modules, refer to the architectures of the wireless charging systems described in FIG. 1 and FIG. 8. Details are not described herein again.

It can be understood that when the embodiments of this application are applied to a transmitter chip, the transmitter chip implements functions of the transmitter in the foregoing method embodiment. The transmitter chip sends information to another module (for example, a radio frequency module or an antenna) of the transmitter, and the information is sent to the receiver using the other module of the transmitter. Alternatively, the transmitter chip may receive information from another module (for example, a radio frequency module or an antenna) of the transmitter, and the information is sent to the transmitter by the receiver.

It can be understood that when the embodiments of this application are applied to a receiver chip, the receiver chip implements functions of the receiver in the foregoing method embodiment. The receiver chip sends information to another module (for example, a radio frequency module or an antenna) of the receiver, and the information is sent to the transmitter using the other module of the receiver. Alternatively, the receiver chip may receive information from another module (for example, a radio frequency module or an antenna) of the receiver, and the information is sent to the transmitter by the receiver.

It can be understood that in this application, technical terms and technical solutions between different embodiments may be combined or referenced with each other based on internal logic of the different embodiments. The embodiments to which the technical terms and the technical solutions are applied are not limited in this application. A new embodiment may further be formed by mutually combining the technical solutions in the different embodiments.

It can be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logical device, a transistor logic device, a hardware component, or any combination thereof. The general-purpose processor may be a microprocessor or any conventional processor.

The method steps in the embodiments of this application may be implemented by hardware, or may be implemented by a processor executing a software instruction. The software instruction may include a corresponding software module. The software module may be located in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc ROM (CD-ROM), or a storage medium of any other form known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a sending device or a receiving device. Certainly, the processor and the storage medium may exist in the sending device or the receiving device as discrete components.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or transmitted using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the procedures of the methods in the foregoing embodiments may be implemented by a computer program instructing related hardware. The program may be stored in the computer readable storage medium. When the program runs, the procedures of the foregoing method embodiments are performed. The foregoing storage medium includes any medium that can store program code, such as a ROM, a RAM, a magnetic disk, or an optical disc.

What is claimed is:

1. A wireless charging system comprising:
   a transmitter oscillation circuit, comprising:
      a transmitter, comprising:
         a transmitter coil; and
         a first series matching capacitor coupled to the transmitter coil in series, wherein the transmitter oscillation circuit is configured to:
            transfer power; and
            apply a self-inductance $L_p$, when transferring power and when a capacitance of the first series matching capacitor is $C_p$;
   a first voltage regulator coupled to the transmitter oscillation circuit and configured to output a direct current (DC) voltage; and
   a receiver oscillation circuit coupled to the transmitter oscillation circuit and comprising:
      a receiver, comprising:
         a receiver coil; and
         a second series matching capacitor coupled to the receiver coil in series, wherein the receiver oscillation circuit is configured to:
            receive the power transferred by the transmitter oscillation circuit; and
            apply a self-inductance $L_s$ when receiving the power and when a capacitance of the second series matching capacitor is $C_s$,
   wherein $$\frac{L_p * C_p}{L_s * C_s} = k,$$

and
   wherein $0.85 \leq k \leq 1.2$,
   wherein the wireless charging system is configured to operate at a load-independent point when a voltage gain is based on an output voltage of the receiver and an input voltage of the transmitter,
   wherein the load-independent point is based on a first operating frequency and the voltage gain,
   wherein the voltage gain is independent of an output load of the receiver at the first operating frequency,
   wherein the voltage gain is X,
   wherein:

$$X = \sqrt{\frac{Cp - \frac{Const}{Lm}}{Cs}}$$

wherein $Const = L_p * C_p - L_s * C_s$; and
   wherein $L_m$ is a primary excitation inductance of the transformer equivalent to the transmitter and the receiver.

2. The wireless charging system of claim 1, wherein X is a positive number that meets $0.8 * \sqrt{C_p/C_s} \leq X \leq 1.2 * \sqrt{C_p/C_s}$.

3. The wireless charging system of claim 2, wherein k is 1, and wherein X is $\sqrt{C_p/C_s}$.

4. The wireless charging system of claim 2, wherein k is about 1, and wherein X is based on a ratio of $L_s$ to $L_p$.

5. The wireless charging system of claim 1, wherein the first voltage regulator is coupled to the transmitter oscillation circuit in parallel, and wherein the first voltage regulator is further configured to regulate an input voltage of the transmitter to set a voltage gain between an output voltage of the receiver and the input voltage of the transmitter.

6. The wireless charging system of claim 1, wherein the receiver further comprises a second voltage regulator coupled to the receiver oscillation circuit in parallel, and wherein the second voltage regulator is configured to regulate an output voltage of the receiver to set a voltage gain between the output voltage of the receiver and an input voltage of the transmitter.

7. The wireless charging system of claim 1, wherein the receiver is a user equipment (UE), an access terminal, a subscriber, a subscriber station, a remote station, a remote terminal, a user terminal, or a user agent.

8. A transmitter, comprising:
   a transmitter oscillation circuit, comprising:
      a transmitter coil; and
      a first series matching capacitor coupled to the transmitter coil in series; and
   a voltage regulator coupled to the transmitter oscillation circuit and configured to output a direct current (DC) voltage,
   wherein the transmitter oscillation circuit is configured to:
      transfer power to a receiver; and
      apply a self-inductance $L_p$ when the power is transferred and when a capacitance of the first series matching capacitor is $C_p$, wherein $L_p * C_p = k * L_s * C_s$, wherein $L_s$ is a self-inductance of a receiver coil in the receiver when the receiver receives the power transferred by the transmitter oscillation circuit, wherein $C_s$ is a capacitance of a second series matching capacitor in the receiver, wherein a ratio of the Lp and Cp to the Ls and Cs is k, wherein k is a positive number that meets 0.8≤k≤1.2, wherein the receiver coil is coupled to the second series matching capacitor in series to form a receiver oscillation circuit configured to receive the power transferred by the transmitter oscillation circuit, wherein a wireless charging system comprises the transmitter and the receiver, wherein the wireless charging system operates at a load-independent point when a voltage gain is based on an output voltage of the receiver and an input voltage of the transmitter, wherein the load-independent point is based on a first operating frequency and the voltage gain, wherein the voltage gain is independent of an output load of the receiver at the first operating frequency, wherein the voltage gain is X, wherein:

$$X = \sqrt{\frac{Cp - \frac{Const}{Lm}}{Cs}}$$

wherein Const=$L_p*C_p - L_s*C_s$, and wherein $L_m$ is a primary excitation inductance of the transformer equivalent to the transmitter and the receiver.

9. The transmitter of claim 8, wherein X is a positive number that meets $0.8*\sqrt{C_p/C_s} \leq X \leq 1.2*\sqrt{C_p/C_s}$.

10. The transmitter of claim 9, wherein k is 1, and wherein X is $\sqrt{C_p/C_s}$.

11. The transmitter of claim 9, wherein k is 1, and wherein X is based on a ratio of $L_s$ and $L_p$.

12. The transmitter of claim 8, wherein the voltage regulator is coupled to the transmitter oscillation circuit in parallel and is configured to regulate an input voltage of the transmitter to set the voltage gain between an output voltage of the receiver and the input voltage of the transmitter.

13. The transmitter of claim 8, wherein the transmitter is configured to:
receive, from the receiver, a first output voltage and a first voltage gain;
set an input voltage of the transmitter based on the first output voltage and the first voltage gain; and
transfer power at the first voltage gain.

14. A receiver, comprising:
a receiver oscillation circuit, comprising:
a receiver coil; and
a first series matching capacitor coupled to the receiver coil in series; and
a voltage regulator coupled to the receiver oscillation circuit and configured to receive a direct current (DC) voltage,
wherein the receiver oscillation circuit is configured to:
receive power; and
apply a self-inductance $L_s$ when the power is received and when a capacitance of the first series matching capacitor is $C_s$, wherein $$L_s * C_s = \frac{L_p * C_p}{k},$$

wherein $L_p$ is a self-inductance applied when a transmitter coil in a transmitter transfers the power to the receiver, wherein $C_p$ is a capacitance of a second series matching capacitor in the transmitter, wherein k is a positive number that meets 0.8≤k≤1.2, and wherein the transmitter coil is coupled to the first series matching capacitor in series to form a transmitter oscillation circuit configured to transfer the power to the receiver oscillation circuit, wherein a wireless charging system comprises the transmitter and the receiver, wherein the wireless charging system operates at a load-independent point when a voltage gain is based on an output voltage of the receiver and an input voltage of the transmitter, wherein the load-independent point is based on a first operating frequency and the voltage gain, wherein the voltage gain is independent of an output load of the receiver at the first operating frequency, wherein the voltage gain is X, wherein:

$$X = \sqrt{\frac{Cp - \frac{Const}{Lm}}{Cs}}$$

wherein Const=$L_p*C_p - L_s*C_s$, and wherein $L_m$ is a primary excitation inductance of the transformer equivalent to the transmitter and the receiver.

15. The receiver of claim 14, wherein X is a positive number that meets $0.8*\sqrt{C_p/C_s} \leq X \leq 1.2*\sqrt{C_p/C_s}$.

16. The receiver of claim 15, wherein k is 1, and wherein X is $\sqrt{C_p/C_s}$.

17. The receiver of claim 15, wherein k is 1, and wherein X is based on a ratio of $L_s$ and $L_p$.

18. The receiver of claim 14, wherein the voltage regulator is coupled to the receiver oscillation circuit in parallel and is further configured to regulate an output voltage of the receiver to set a voltage gain based on the output voltage of the receiver and an input voltage of the transmitter.

19. The receiver of claim 14, wherein the receiver is configured to:
receive, from the transmitter, information indicating a first input voltage; and
set an output voltage of the receiver to a first output voltage based on the first input voltage and a first voltage gain.

20. The receiver of claim 14, wherein the receiver is a user equipment (UE), an access terminal, a subscriber, a subscriber station, a remote station, a remote terminal, a user terminal, or a user agent.

* * * * *

UNITED STATES PATENT AND TRADEMARK OFFICE
CERTIFICATE OF CORRECTION

PATENT NO. : 11,735,956 B2
APPLICATION NO. : 16/879309
DATED : August 22, 2023
INVENTOR(S) : Changsheng Pei, Zhiqiang Zeng and Yongfa Zhu It is certified that error appears in the above-identified patent and that said Letters Patent is hereby corrected as shown below:

In the Claims

Claim 1, Column 57, Line 50: "$L_p$, when" should read "$L_p$ when"

Claim 1, Column 58, Line 8: "$0.85 \leq k \leq 1.2$" should read "$0.8 \leq k \leq 1.2$"

Signed and Sealed this
Thirty-first Day of October, 2023

Katherine Kelly Vidal
*Director of the United States Patent and Trademark Office*